US012754151B2

(12) United States Patent
Nitsche

(10) Patent No.: US 12,754,151 B2
(45) Date of Patent: Oct. 6, 2026

(54) SYSTEM AND METHOD FOR APPROXIMATING X-RAY INTENSITIES FOR A SAMPLE MEASURED BY AN X-RAY DETECTION SYSTEM

(71) Applicant: Bruker AXS SE, Karlsruhe (DE)

(72) Inventor: Fabian Nitsche, Wörth am Rhein (DE)

(73) Assignee: Bruker AXS SE, Karlsruhe (DE)

( * ) Notice: Subject to any disclaimer, the term of this patent is extended or adjusted under 35 U.S.C. 154(b) by 100 days.

(21) Appl. No.: 19/040,620

(22) Filed: Jan. 29, 2025

(65) Prior Publication Data

US 2025/0251356 A1 Aug. 7, 2025

(30) Foreign Application Priority Data

Feb. 1, 2024 (EP) .................................... 24155408

(51) Int. Cl.
*G01N 23/2209* (2018.01)
*G01N 23/207* (2018.01)
*G01N 23/223* (2006.01)

(52) U.S. Cl.
CPC ..... *G01N 23/2209* (2018.02); *G01N 23/2076* (2013.01); *G01N 23/223* (2013.01); (Continued)

(58) Field of Classification Search
CPC ........... G01N 23/2209; G01N 23/2076; G01N 23/223; G01N 2223/305; G01N 2223/315; G01N 2223/316
See application file for complete search history.

(56) References Cited

U.S. PATENT DOCUMENTS

2004/0066886 A1* 4/2004 Elam .................... G01N 23/223 378/45
2023/0060446 A1 3/2023 Kataoka et al.
(Continued)

FOREIGN PATENT DOCUMENTS

EP 4220143 A1 8/2023

OTHER PUBLICATIONS

B. Beckhoff et al.: "Handbook of Practical X-Ray Fluorescence Analysis," 2006th ed., Springer, 2006, 898 pages.
(Continued)

*Primary Examiner* — Chih-Cheng Kao
(74) *Attorney, Agent, or Firm* — Brake Hughes Bellermann LLP

(57) ABSTRACT

One or more X-ray intensities for a sample may be approximated. Measured intensities are received from an X-ray detection system at one or more diffraction angles. A sample simulation module computes simulated sample intensities from an X-ray fluorescence sample model with initial sample model parameters indicating the sample composition and/or layer thickness of one or more sample layers. A correction module applies a triangular collimator correction to the simulated sample intensities and determines a mathematical distance between the corrected simulated sample intensities and corresponding measured intensities. The sample model parameters are adjusted and the correction steps are repeated until the distance change falls below a minimal distance change. The sample model parameters regarding sample composition and/or the layer thickness associated with the corrected simulated intensities are provided as approximated concentration values of respective components contained in the measured sample and/or the layer thickness of the measured sample.

20 Claims, 9 Drawing Sheets

(52) U.S. Cl.
CPC . *G01N 2223/305* (2013.01); *G01N 2223/315* (2013.01); *G01N 2223/316* (2013.01)

(56) References Cited

U.S. PATENT DOCUMENTS

| | | | | |
|---|---|---|---|---|
| 2023/0280291 | A1* | 9/2023 | Yun | G01N 23/2204 378/44 |
| 2023/0366840 | A1 | 11/2023 | Porta et al. | |
| 2024/0060914 | A1* | 2/2024 | Mahvash | G01N 23/205 |

OTHER PUBLICATIONS

Extended European Search Report for European Patent Application No. 24155408.8, mailed on Aug. 14, 2024, 9 pages.
Song, et al., "Fast Modelling of the Collimator-Detector Response in Monte Carlo Simulation of Spect Imaging Using the Angular Response Function; Fast Collimator-Detector Response Modelling in Monte Carlo Simulation of Spect", Physics in Medicine and Biology, Institute of Physics Publishing, vol. 50, No. 8, Apr. 21, 2005, pp. 1791-1804.
Tack, et al., "An X-Ray Ray Tracing Simulation Code for Mono- and Polycapillaries: Description, Advances and Application", Spectrochimica Acta. Part B: Atomic Spectroscopy, vol. 173, Sep. 9, 2020, 6 pages.
Zhalsaraev, et al., "X-Ray Scattering and Polorization in Wavelength-Dispersive Spectrometers", X-Ray Spectrometry, vol. 49, No. 4, Jul. 1, 2020, pp. 480-492.

* cited by examiner

SYSTEM AND METHOD FOR APPROXIMATING X-RAY INTENSITIES FOR A SAMPLE MEASURED BY AN X-RAY DETECTION SYSTEM

CROSS-REFERENCE TO RELATED APPLICATION

This application claims priority to EP Patent Application No. EP24155408.8, filed on Feb. 1, 2024 and entitled "System and method for approximating X-ray intensities for a sample measured by an X-ray detection system," the disclosure of which is hereby incorporated by reference in its entirety.

TECHNICAL FIELD

The present description generally relates to wave-length dispersive X-ray spectroscopy, and more particularly relates to approximating X-ray intensities for a sample measured by an X-ray detection system.

BACKGROUND

X-ray spectrometers are used to quantify the composition and/or structure of a material (sample) by correlating intensities to mass fractions of the elements of the sample and/or layer thicknesses. This is done by modelling the interaction of radiation with the sample and calculate expected intensities. Starting from an arbitrary (but similar) sample composition and/or structure, the sample parameters are changed until the calculated intensities match the measured intensities best.

The generation of X-rays in the sample can be induced by photons from an X-ray tube. These methods are called energy-dispersive X-ray fluorescence (EDX) or wave-length dispersive X-ray fluorescence (WDX) spectrometry. If the X-rays in the sample are induced by electrons from an electron emitter in a scanning electron microscope, transmission electron microscope or an electron probe microanalyzer (EPMA), the methods are called energy-dispersive X-ray spectrometry (EDS) and wave-length dispersive spectrometry (WDS). The here described solution is addressing the wave-length dispersive detection system and is independent of the origin of the X-rays. The following description discusses an approach using a WDX spectrometer.

In WDX spectroscopy, an X-ray tube generates polychromatic radiation including characteristic lines and Bremsstrahlung. The radiation is directed on a sample to be analyzed. The radiation generates polychromatic X-ray fluorescence and scattered radiation in the sample. In a wave-length-dispersive X-ray fluorescence spectrometer, the radiation emitted by the sample is analyzed by measuring, with a goniometer, the radiation reflected by a monochromator of the spectrometer (typically a crystal) at various diffraction angles θ. The monochromator of a WDX system is typically a single crystal that achieves monochromatic radiation by diffraction. This technique is based on Bragg's law $$n\lambda = 2d\sin\theta \tag{F1}$$

where n is the diffraction order, λ the wavelength, d the lattice plane distance of the crystal and θ is the angle of the incoming and outgoing radiation with respect to the crystal surface. The energy E is connected to the wavelength λ by $$E = \frac{hc}{\lambda} \tag{F2}$$

where h is the Planck constant and c is the speed of light. This can be simplified to $$E = n\frac{12.4}{2d\sin\theta}\text{keV Å} \tag{F3}$$

Due to the diffraction order n, photons with multiples of energy E(n=1) can reach the detector.

Thus, the detector must be able to discriminate between photons of the diffraction orders. Most detectors are designed to define this discrimination windows in fractions of the first diffraction order energy. A lower discrimination limit of 50% together with an upper discrimination limit of 150% means that photons that are registered by the detector with energies between half and one and a half of the first order energy are summed up to form the analytical relevant intensity for the spectrometer.

Historically, the detectors were only able to sum up all photons of a single discrimination window. Modern detectors can sort photons by their energy in multiple channels using a multi-channel analyzer (MCA). With that technology it is easier to identify additional effects contributing to the background (part of the intensity that does not originate from the element to be analyzed).

In summary, WD spectra commonly show the integration of an energy region of the response of the monochromator as intensity over 2θ (corresponding to the first order energy). It thus also includes artifacts created by the crystal or detector contributing to the background. These artifacts can increase the background by fluorescence of the crystal and its holder, diffuse scattering of the radiation from the sample, higher order escape or reduce the intensity of the element to be analyzed by pile-up and first order escape. All these artefacts affect the analytical performance of the detection system.

The physical processes behind the interaction of X-rays in the device and sample are very complex. Multiple processes occur simultaneously in each the X-ray tube, sample, and detector. The resulting spectrum contains the actual analytical signal and contributions to the background. The contributions to the background are scattered tube radiation and technically unavoidable contributions (artifacts) that may originate from the WDX detection system itself.

Empirical models to estimate/calculate the analytically relevant intensities and the background are known in the art. However, empirical models need calibration on the actual device with standard samples that are closely related to the sample to quantify and have no means to predict the full shape of the background. Such models need to determine the efficiency of detection (the ratio between predicted intensity and measured intensity) for each crystal/collimator/detector combination individually.

On the other hand, full simulation models (from first principles/ab initio) allow for much wider applicability of the model to various sample parameters and device configurations. They allow the prediction of the analytically relevant intensities and the background of almost any sample material and shape. The most detailed calculations are Monte-Carlo based methods, that trace individual photons or groups of photons through the detection system. However, these methods are very slow and complex, and therefore, inconvenient for being used in an industrial context.

Consequently, WDX detection systems containing collimators, a crystal monochromator and the actual detector are still approximated by empirical or semi-empirical methods. The full simulation of WDX spectra stops right before the detection system which is modelled empirically. Therefore, a lot of effort is needed to measure and extract peak information (the variation of all typically available collimators, crystals and detectors typically leads to 3*5*2=30 different settings that must be measured and analyzed for multiple single element standards and their multiple emission lines). Additionally, this must be redone for each new crystal, collimator and detector combination or any change to the device. Further, the continuous background of the spectrum must be adjusted semi-empirically by the absorption of the sample and the previously determined efficiency of the WD detection system, again individually for each combination of collimator, crystal, and detector.

SUMMARY

There is therefore a need for systems and methods that calculate the interactions of the X-rays with the sample and the WDX detection system as a collective process, achieving the best compromise between calculation speed and accuracy. The herein disclosed approach provides a fully physics- and geometry-based model for all interactions happening in the WDX detection system, thus allowing the full simulation of WDX spectra.

In particular, the approach enables the correction of simulated spectra by taking into account various impacts of the detection system on the measured intensities such that the corrected simulated intensities provide a reliable approximation of the measured intensities. This allows to indirectly measure the sample composition and/or a layer thickness of the measured sample via the model parameters related to the sample composition and/or layer thickness once the simulated intensities are within a predefined distance to the measured intensities. In a first approximation, reliable results are already achieved when applying a correction to the simulated intensities in accordance with the independent claims by taking into account the impact of the collimator(s) of the detection system on the measured intensities.

Additionally, herein disclosed optional embodiments comprise further corrections which take into account the following background contributions caused by the detection system (cf. Portnoi et al., Filtration of Amplitude Spectra for Reducing the Background Level in X-Ray Fluorescence Analysis, J. Anal. Chem. 60, 838 (2005)):

- Sample scattered tube radiation (especially bremsstrahlung) $I_{B\lambda_1}$.
- Sample scattered tube radiation of second order of the monochromator $I_{B\lambda_2}$.
- Diffuse (non-Bragg) scattering of the radiation from the sample hitting the monochromator $$I_d^p \text{ and } I_d^f.$$

- Fluorescence of the monochromator itself $$I_f^f \text{ and } I_p^f.$$

In the herein disclosed approach, the detection system for WDX devices is modelled such that the parameters to be adjusted are less than in prior art approaches and the influence of the parameters is correctly connected to the respective components of the detection system such that changing one component does not invalidate previously determined parameters of other components. For example, with regard to the corrections of the divergence of the collimator, the respective system component parameter is the measurable divergence of the collimator, and with regard to the correction regarding the length of the monochromator, the length parameter it is the measurable length of the crystal.

In a basic embodiment, in accordance with claim 1, a computer-implemented method is provided for approximating one or more X-ray intensities for a sample measured by an WD detection system. The computer-implemented method can be executed by a computer system which is adapted to execute functional modules implemented by software or hardware. Respective software is loaded into a memory of the computer system and executed by one or more processors of the computer system. The detection system comprises at least one collimator having a given angular range (divergence), a crystal monochromator and an X-ray detector. The method starts with receiving one or more measured intensities from the detection system at respective one or more diffraction angles. Typically, a spectrum of said sample is measured which covers an energy range associated with a series of varying diffraction angles between the X-ray radiation and the crystal monochromator. However, the method can also be applied for single measurements at a given diffraction angle.

The system computes for the respective one or more diffraction angles, one or more simulated sample intensities from an X-ray fluorescence sample model with initial sample model parameters indicating the sample composition and/or layer thickness of one or more sample layers. For example, the system may comprise a sample simulation module which stores said sample model together with respective model parameters for simulation purposes. Sample models which can simulate the X-ray fluorescence spectrum of a sample containing one or more substances are known in the art. The simulated sample intensities are counterparts to the measured intensities in that they are simulated for the same diffraction angles which were used by the measurement. That is, in case an entire spectrum was measured for said sample, a corresponding simulated sample spectrum can be computed.

The simulated sample intensities describe the X-ray fluorescence radiation which is theoretically emitted by the sample in response to polychromatic X-ray radiation generated by an X-ray tube and directed to the sample. However, this is not the radiation which is finally measured by the detector because the various components of the detection system are responsible for a variety of effects which modify the radiation emitted by the sample. Therefore, the simulated sample intensities are corrected such that the influence of respective detection system components on the emitted radiation is taken into account. Thereby, the sample model parameters correspond to properties of the measured sample. That is, once the simulated sample intensities are corrected and fitted to the measured intensities, the sample model parameters provide an estimate for the properties of the measured sample.

In accordance with the independent claims, at least a collimator correction is applied to the one or more simulated sample intensities for the respective one or more diffraction angles. Typically, the detection system has two collimators-one between the sample and the crystal, and another between the crystal and the detector. However, the detection system may also use just a single collimator. Advantageously, a single collimator may be installed between the sample and the crystal. The collimator correction function may be provided by a correction module of the system which optionally also may provide further correction functions as depicted by the dependent claims.

The collimator correction function determines, for each of the one or more diffraction angles, an integral over an energy range allowed by the angular range/divergence of the at least one collimator. It is to be noted that, even for a particular diffraction angle, the detector integrates over a certain energy range reaching from a start energy to an end energy for said particular diffraction angle. The relative intensity distribution in the angular range caused by the angular tolerance of the crystal monochromator defined by the divergence of the at least one collimator is represented by an approximation function (advantageously a piecewise linear function) approximating a triangular shaped profile. In other words, the relative intensity is '0' at the outer limits of the angular range and has a maximum for the diffraction angle which is associated with a ray traversing the collimator in parallel to the collimator walls. Connecting the maximum relative intensity with the '0'-intensities at the outer limits leads to the triangular shaped profile. The integral is then computed over the product of a multiplication of the respective simulated sample intensity with said approximation function. The determined integral represents a corrected simulated sample intensity for the respective diffraction angle. The collimator correction function can then be applied to all diffraction angles of a part of or an entire simulated sample spectrum thus leading to a corresponding corrected simulated sample spectrum.

An optimization module then determines a mathematical distance between the one or more corrected simulated sample intensities and corresponding one or more measured intensities. Commonly known distance metrics include the (weighted) Euclidian Distance and the Minkowski Distance. A person skilled in the art may use any other distance metrics which is suitable to measure the similarity of the corrected simulated intensities and the measured intensities.

Then, the system adjusts the sample model parameters indicating the sample composition and/or layer thickness in such a way that it reduces the distance (e.g. along the first derivative) and repeats the preceding two determining steps and the adjusting step until the change of the distance falls below a minimal distance change (in other words, the first derivative is close to zero). The minimal distance change may be a predefined threshold value or it may correspond to a predefined percentage.

Once the simulated sample intensities are close enough to the measured intensities (i.e., the distance change has fallen below the threshold), the latest sample model parameters of the sample model indicating the sample composition and/or layer thickness are provided as approximated concentration values of respective components contained in the measured sample and/or said layer thickness of the measured sample. In other words, the sample model parameters associated with the latest corrected simulated intensities represent the result of an indirect measurement method for determining the sample composition and/or a layer thickness of the sample from which the measure intensities had been obtained. It is to be noted that the sample may comprise multiple layers in which case each layer thickness can be a parameter of the sample model.

In the following, further optional corrections of the simulated sample intensities, in accordance with optional embodiments of the dependent claims, are described which are associated with other artefacts caused by components of the detection system in the measured intensities. The further corrections can form part of said method in any combination and are performed by the system on top of the collimator correction. In other words, the collimator correction may be combined with any of the further corrections. Thereby, with the exception of the background corrections, all other further corrections provide a multiplicative correction factor which is multiplied with the simulated sample intensities. In the case of the background corrections, they are simply added to the result provided by the other corrections.

In one embodiment, the system further applies a polarization correction to the one or more simulated sample intensities such that, for each of the one or more diffraction angles, the simulated sample intensity is computed as the sum of an emission radiation emitted by the sample multiplied by a first polarization factor for single scattering at the monochromator and a scattered tube radiation scattered by the sample multiplied by a second polarization factor for double scattering at the sample and at the monochromator.

In one embodiment, the system further applies a crystal length correction to the one or more simulated sample intensities such that, for diffraction angles where the projection of the collimator height on the crystal monochromator plane is larger than the length of the crystal, the one or more simulated sample intensities are multiplied by the ratio of the length of the crystal to the length of the projection of the collimator height on the crystal monochromator plane.

In one embodiment, the detection further has a detector window between the crystal monochromator and the X-ray detector. In this embodiment, the method further takes into account the impact of said detector window in that the system further applies a window transmission correction to the one or more simulated sample intensities such that, for each respective diffraction angle, the simulated sample intensity is multiplied by a transmission factor defined by the material and thickness of the detector window. Thereby, the transmission factor is defined as the ratio of the X-ray intensity between the detector window and the detector to the X-ray intensity between the crystal and the detector window.

In one embodiment, the system further applies a detector efficiency correction to the one or more simulated sample intensities such that, for each respective diffraction angle, the simulated sample intensity is multiplied by an absorption factor defined by the material and thickness of the detector. Thereby, the absorption factor is defined as the ratio of the intensity absorbed by the active detector material to the intensity incident to the active detector material.

In one embodiment, the system further applies a crystal diffraction efficiency correction to the one or more simulated sample intensities such that, for each respective diffraction angle, the simulated sample intensity is divided by the part of the incoming intensity being absorbed by the crystal and adjusted by a crystal geometry factor.

In one embodiment, the system further applies a pile-up correction to the one or more simulated sample intensities such that, for each respective diffraction angle, the simulated sample intensity is multiplied by an exponential function describing the intensity loss which results from counting two photons arriving within a predefined time window as a single photon with the double energy optionally cut by the detector's upper limit of discrimination.

In one embodiment, the system further applies a correction to the one or more simulated sample intensities, for taking into account an intensity loss caused by the escape of photons from the active detector material, and/or an intensity gain caused by higher diffraction order artefacts of the monochromator, such that, for each respective diffraction angle, the corresponding intensity loss and/or intensity gain is added to the corrected simulated sample intensity.

In an embodiment where all of the above corrections have been applied to one or more simulated sample intensities, the respective corrected simulated sample intensity provides an optimized quantification of the composition of the sample based on the one or more measured intensities.

In one embodiment, a computer program product is provided for approximating one or more X-ray intensities of a sample measured by an X-ray fluorescence detection system. The computer program product comprises computer readable instructions that, when loaded into a memory of a computing device and executed by at least one processor of the computing device, causes the computing device to perform the computer-implemented method as disclosed herein.

In one embodiment, a computer system is provided for approximating one or more X-ray intensities for a sample measured by an X-ray fluorescence detection system with at least one collimator having a given angular range, a crystal monochromator and an X-ray detector. The computer system may be the computing device adapted to execute said computer program for performing the herein disclosed computer-implemented method.

In particular, a basic embodiment of the system adapted to perform the basic embodiment of the computer-implemented method comprises an interface adapted to receive one or more measured intensities from the detection system at respective one or more diffraction angles. Interfaces for the exchange of data between an X-ray fluorescence detection system and a computer system are known in the art.

The system further has a sample simulation module adapted to compute, for the respective one or more diffraction angles, one or more simulated sample intensities from an X-ray fluorescence sample model with initial sample model parameters regarding the sample composition and/or a layer thickness.

A correction module of the system is adapted to apply a collimator correction to the one or more simulated sample intensities for the respective one or more diffraction angles by:

determining, for each of the one or more diffraction angles, an integral over an energy range allowed by the angular range/divergence of the at least one collimator, wherein the integral is computed over the product of a multiplication of the respective simulated sample intensity with an approximation function (advantageously a piecewise linear function) approximating a triangular shaped profile representing a relative intensity distribution in the angular range caused by the angular tolerance of the crystal monochromator defined by the divergence of the at least one collimator, the determined integral representing a corrected simulated sample intensity;

determining a mathematical distance between the one or more corrected simulated sample intensities and corresponding one or more measured intensities; and adjusting the sample model parameters indicating the sample composition and/or layer thickness and repeating the determining steps and the adjustment step until the distance falls below a minimal distance.

The interface the system is further adapted to provide the sample model parameters indicating the sample composition and/or layer thickness associated with the corrected simulated intensities as approximated concentration values of respective components contained in the measured sample and/or the layer thickness of the measured sample.

Further aspects of the description will be realized and attained by means of the elements and combinations particularly depicted in the appended claims. It is to be understood that both, the foregoing general description and the following detailed description are exemplary and explanatory only and are not restrictive of the description.

DETAILED DESCRIPTION

Figure 1:
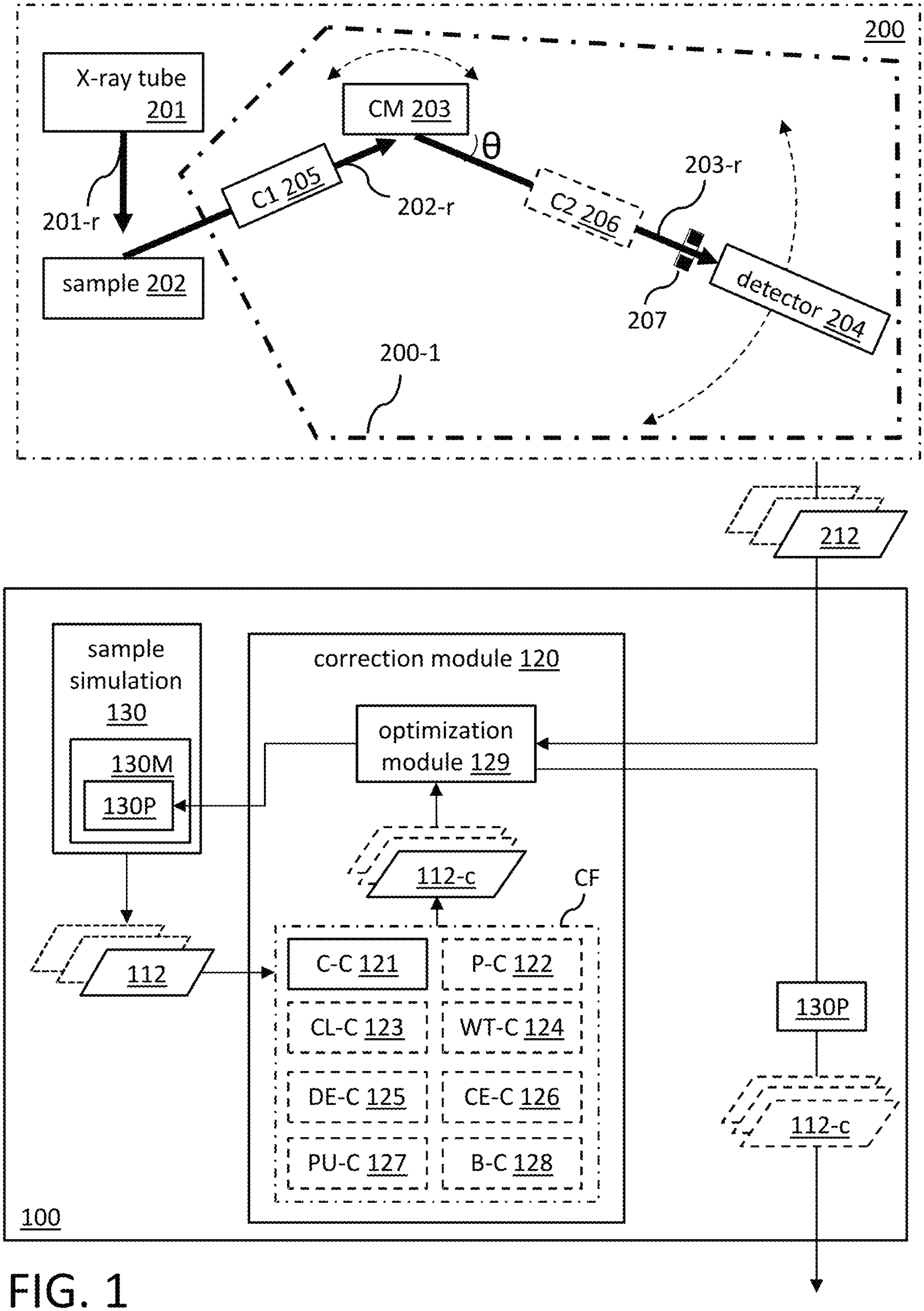
FIG. 1 includes a block diagram of an example embodiment of a computer system for approximating one or more X-ray intensities for a sample measured by a wave-length dispersive X-ray detection system.
Figure 2:
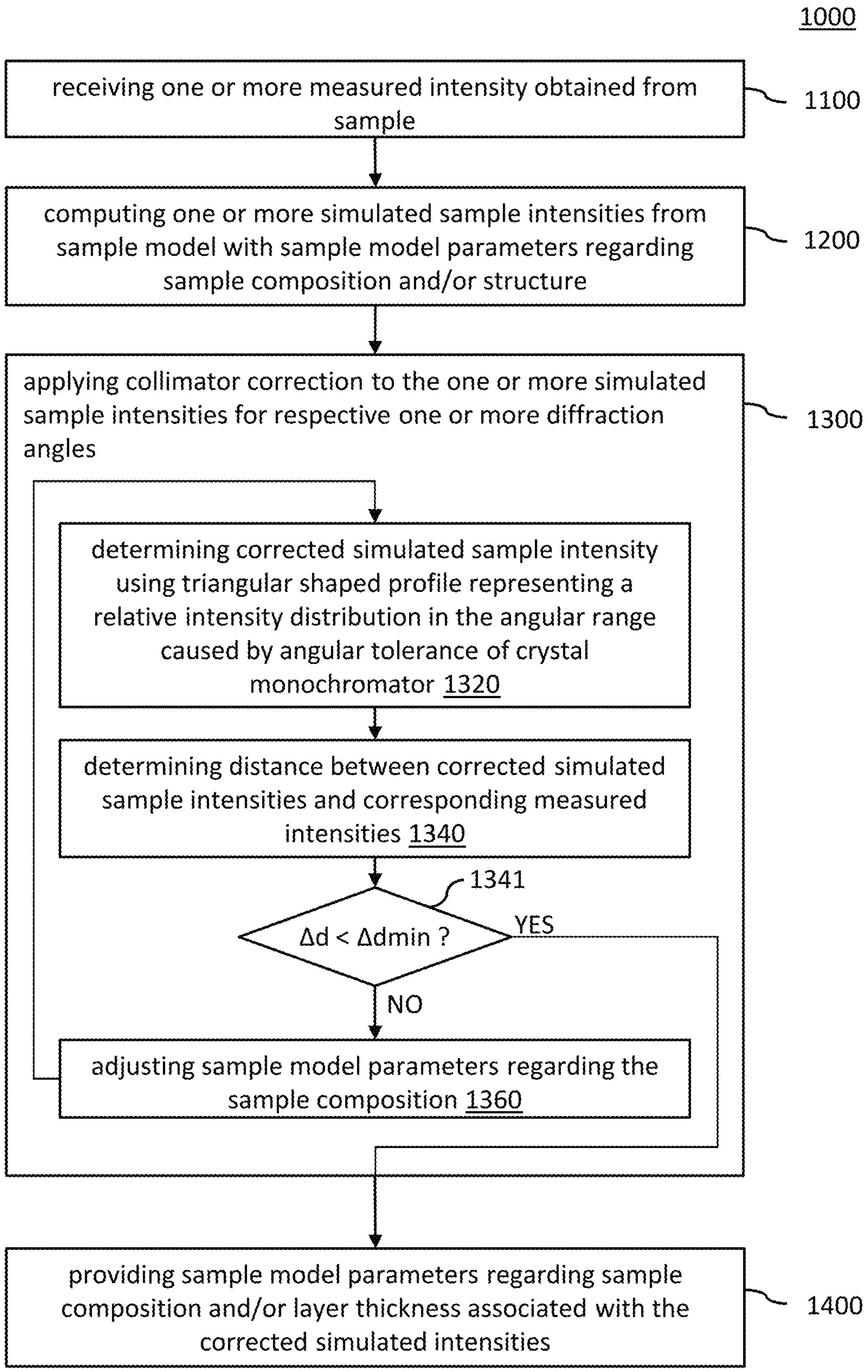
FIG. 2 is a simplified flow chart of a computer-implemented method for approximating such X-ray intensities for said sample according to an embodiment.
Figure 3:
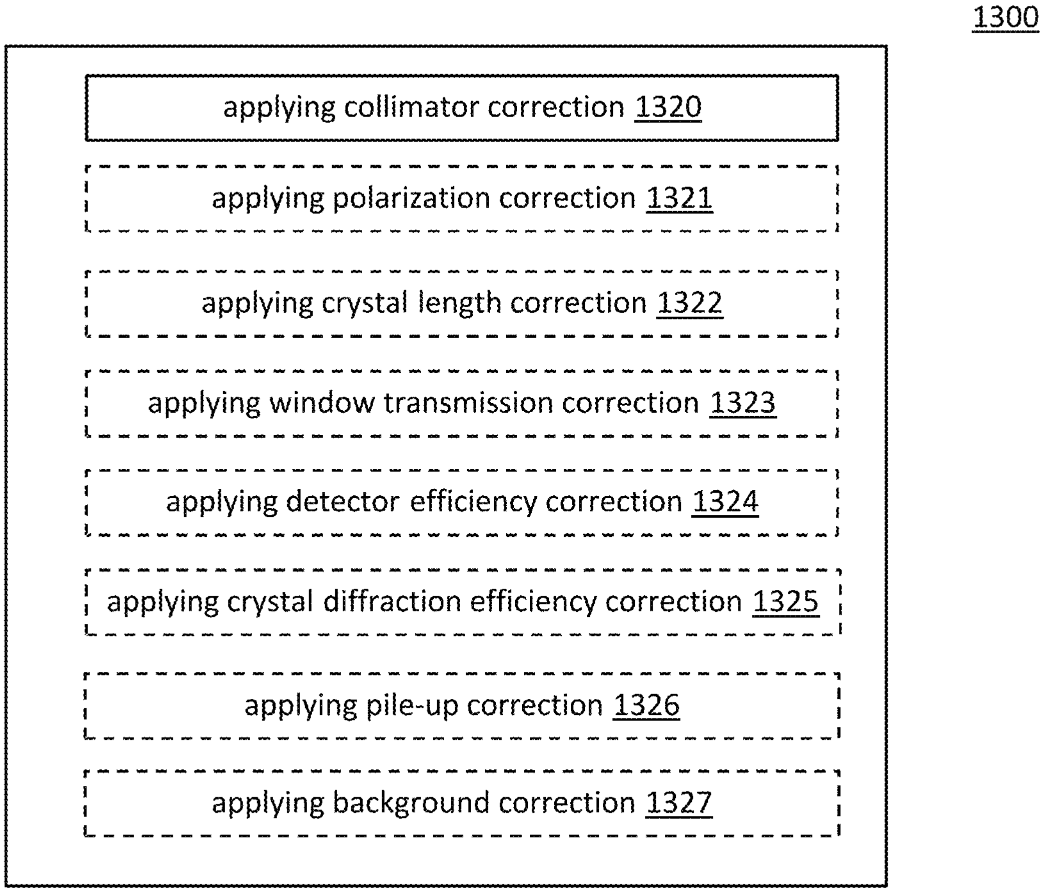
FIG. 3 is an overview of corrections that may be applied according to embodiments.

FIG. 1 includes a block diagram of an example embodiment of a computer system 100 for approximating one or more X-ray intensities for a sample 202 measured by an X-ray detection system 200-1 with at least one collimator 205, 206 having a given angular range/divergence, a crystal monochromator 203 and an X-ray detector 204. The system 100 of FIG. 1 is described in the context of the simplified flow chart of a computer-implemented method 1000 for approximating such X-ray intensities for said sample 202 as illustrated in FIGS. 2 and 3. Therefore, the following description refers to reference numbers used in FIG. 1 and FIGS. 2 and 3. The system 100 is thereby configured to execute the method 1000 when loading a respective computer program into a memory of the system and executing said program with processing means of the system. Said computer program product implements the functional modules 120 and 130 of system 100.

In the example embodiment of FIG. 1, the system 100 is communicatively coupled with the wave-length dispersive X-ray spectrometer 200. In an alternative embodiment, the computer system 100 may be an integrated component of the spectrometer 200. Spectrometer 200 may be a wave-length dispersive X-ray fluorescence spectrometer. In both embodiments, system 100 receives 1100 one or more measured intensities 212 from detection system 200-1 at respective one or more diffraction angles θ. The functioning of the spectrometer 200 has been described to a large extent in the background section. In general, a person skilled in the art knows how the spectrometer 200 can be used to obtain a full intensity spectrum from sample 202 by performing a scan with varying diffraction angles for each measuring point of the spectrum accordingly. The system can also be used to perform a single measurement for obtaining a single intensity value at a particular diffraction angle θ. Nevertheless, the functioning is briefly summarized in the following with a reference to FIG. 1.

The X-ray tube 201 generates polychromatic radiation 201-*r* including characteristic lines and Bremsstrahlung which is directed on a sample 202 to be analyzed. This radiation generates polychromatic X-ray fluorescence as well as scattered radiation 202-*r* in the sample 202. The radiation 202-*r* emitted by the sample 202 is analyzed by measuring, with a goniometer, the radiation reflected by the monochromator 203 (CM) of the spectrometer at various diffraction angles θ. Typically, a collimator 205 (C1) is placed between the sample 202 and CM 203. This technique is based on Bragg's law. X-ray photons 203-*r* of multiples of the energy of the analytical signal arrive at the detector 204 of the spectrometer. A photon hitting the detector 204 is converted into an electric pulse where the pulse height is proportional to the energy of the photon. The detector then only sums up photons with energies between 50 to 150% of the expected energy at the diffraction angle to exclude photons of higher diffraction order resulting in a measured intensity value 212 for each diffraction angle θ.

System 100 has an interface (not shown) suitable to receive 1100 said one or more measured intensities 212 from the detection system 200-1. Such interfaces for the exchange of data between measurement devices, such as spectrometer 200, and computer systems are well known in the art.

System 100 has a sample simulation module 130 that is adapted to compute 1200, for the respective one or more diffraction angles θ, one or more simulated sample intensities 112 from an X-ray fluorescence sample model 130M with initial sample model parameters 130P indicating the sample composition and/or layer thickness of one or more layers of said sample. Any sample model type which is disclosed in the above cited section of the Handbook of Practical X-Ray Fluorescence Analysis may be used. A person skilled in the art may also be able to use other suitable sample model types which are not described in this Handbook.

The system 100 further has a correction module 120 adapted to apply 1300 at least a collimator correction function C-C 121 to the one or more simulated sample intensities 112 for the respective one or more diffraction angles. In optional embodiments, the correction module comprises further optional correction functions 122 to 128 to apply corrections implied by other components of the detection system 200-1. These optional corrections are described in detail further down below.

The collimator correction function C-C 121 determines 1320, for each of the one or more diffraction angles, an integral over an energy range allowed by the angular range of the at least one collimator 205, 206. The integral $I(\overline{E})$ is computed in accordance with formula F4 over the product of the respective simulated sample intensity $i_{sim}(E)$ 112 and an approximation function (e.g., piecewise linear function) T(E) approximating a triangular shaped profile representing a relative intensity distribution in the angular range caused by the angular tolerance of the crystal monochromator defined by the divergence of the at least one collimator:

$$I(\overline{E}) = \int_{E_1}^{E_2} \{T(E) i_{Sim}(E)\} dE \tag{F4}$$

where $E_1$ and $E_2$ are the start and end energies between the detector 204 integrates for the nominal position $\overline{E}$, and $T(\overline{E})$ is a triangular correction taking into account the impact of the collimator(s) on the Xray radiation emitted by the sample. The determined integral $I(\overline{E})$ represents a corrected simulated sample intensity $i_{sim}(E)$ 112-*c*. A person skilled in the art may use other approximation functions such as a Lorentz or Gauss function or (pseudo-) Voigt profile to describe the triangular shaped profile.

Figure 4A:
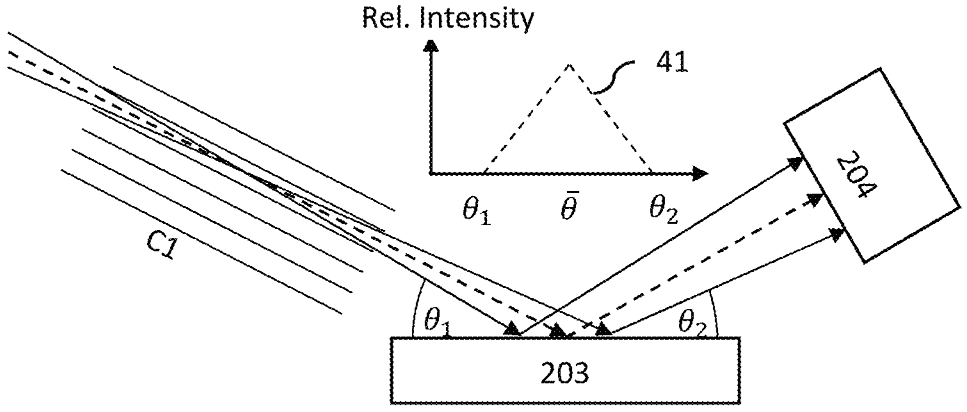
FIG. 4A illustrates the integration width of an X-ray detector and a triangular correction function to take into account the impact of the angular tolerance of a crystal monochromator on simulated intensities according to an embodiment.

The example embodiment of FIG. 4A illustrates the integration width of the detector 204 and the triangular correction function 41 to take into account the impact of the angular tolerance of the crystal monochromator on the simulated intensity $i_{sim}(E)$ as defined by the divergence of one collimator C1. The energy range integrated by the detector 204 is determined by the angular range/divergence allowed by the collimator C1. The angular range is caused by the fact that X-ray beams which are in parallel to the walls of the collimator C1 (e.g., the dashed arrow) end up in the middle ($\overline{\theta}$) of the angular range between $\theta_2$ and $\theta_1$, whereas rays traversing the collimator C1 and having a tilt angle (i.e., not being in parallel to the collimator walls, cf. solid arrows) hit the crystal 203 under diffraction angles between $\theta_2$ and $\theta_1$ slightly deviating from $\overline{\theta}$. The relative intensity over this angular range is not constant, but has a triangular profile as shown by the correction function 41. The ratio of intensity $I_0$ incoming to the collimator C1 and outgoing intensity $I(\alpha)$ where α is the divergence of the ray relative to the collimator axis is:

$$\frac{I_0}{I(\alpha)} = 1 - \frac{|\alpha|}{\alpha_d}, -\alpha_d \le \alpha \le \alpha_d$$

$$\text{where } \alpha_d = \frac{1}{2}(\theta_2 - \theta_1)$$

is the maximum divergence allowed by the collimator.

Figure 4B:
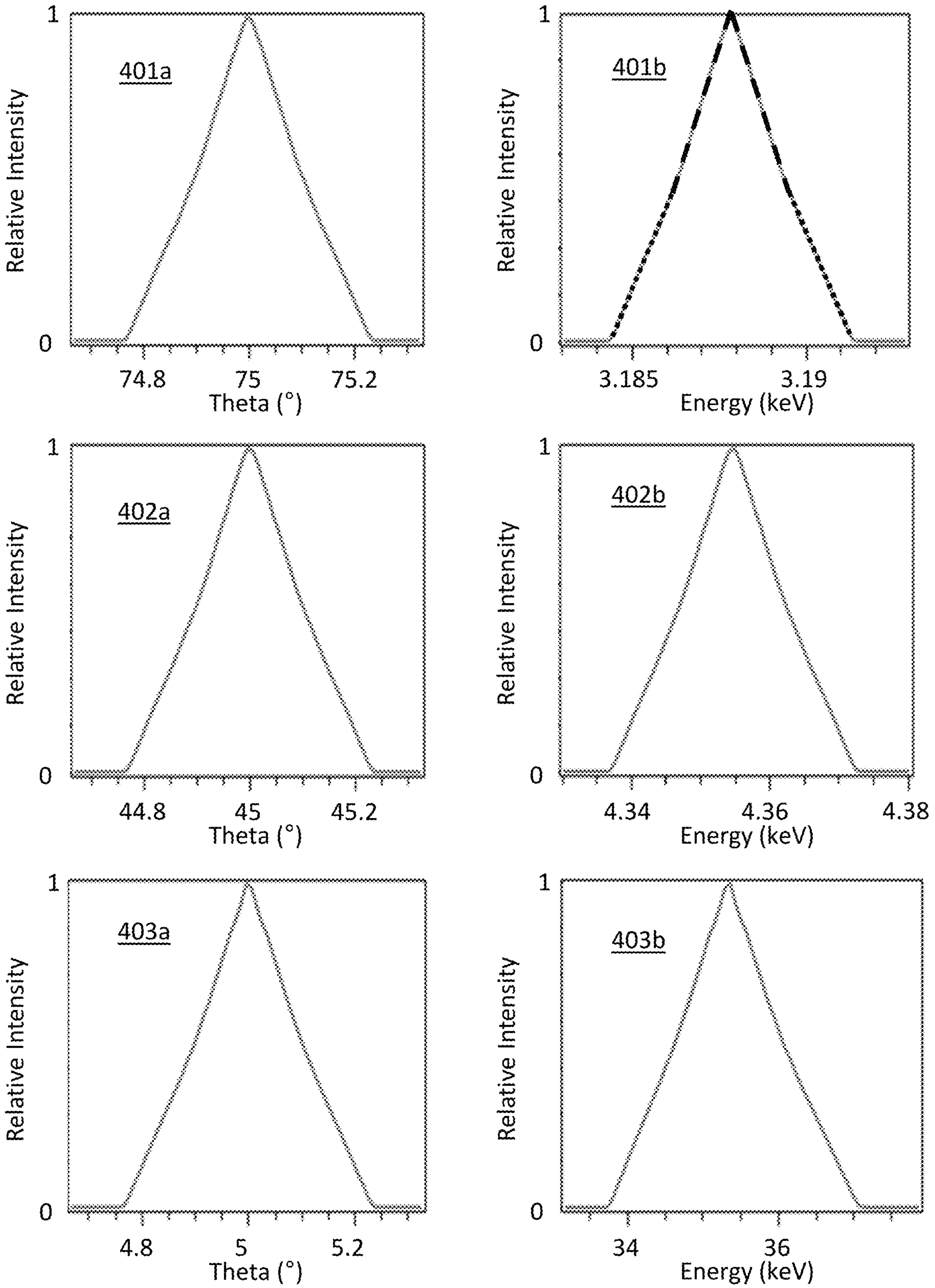
FIG. 4B shows examples of raytracing results for different diffraction angles with corresponding energy distributions when using a LiF200 crystal as monochromator.

In case the detection system 200-1 has two collimators (cf. FIG. 1 C1 205, C2 206) with C1 before and C2 after the crystal, raytracing can be used to investigate the relative intensity over divergence as illustrated in FIG. 4B. For example, a large number of rays $I_o$ are cast from a flat source before the primary collimator C1 in random direction. All rays hitting the walls of the primary collimator are abandoned. The remaining rays are reflected by the crystal towards the detector. Rays that hit the walls of the secondary collimator C2 are also dropped. The finally remaining rays after the secondary collimator are then plotted over their diffraction angle on the crystal, thus providing I(α).

FIG. 4B shows raytracing results for different $\bar{\theta}$values: $\bar{\theta}$=75° (cf. graph 401$a$), θ=45° (cf. graph 402$a$), and $\bar{\theta}$=5° (cf. graph 403$a$), with the corresponding energy distributions 401$b$, 402$b$, 403$b$ for a LiF200 crystal (d=2.01 Å) as monochromator. Graph 401$b$ shows a small deviation from the ideal triangular shape. This deviation depends on the combination of the divergence of the primary and secondary collimators C1, C2. In some situations, the relative intensity can be described as a piecewise linear function to improve the peak shape approximation (dashed and dotted lines graph 401$b$ illustrate such linear pieces).

The intensity integral in equation F4 is defined in the energy E dimension. Therefore, the triangle equation for the triangular collimator correction function is transformed by the Bragg equation F3:

$$E_1 = \frac{12.4}{2d\sin\theta_2}\text{keV Å},$$

$$E_2 = \frac{12.4}{2d\sin\theta_1}\text{keV Å},$$

$$\bar{E} = \frac{12.4}{2d\sin\bar{\theta}}\text{keV Å}.$$

The indices of the limits change from θ to E since the Bragg equation is an inverse transformation. This is shown in $$\int I(\theta)d\theta = -\int I(E)\tan\theta/E\,dE \tag{F5}$$

by the negative sign in front of the integral (cf. A. Iwata, K. Yuge, and J. Kawai, Intensity Correction of WD-XRF Spectra from 2θ to Energy, X-Ray Spectrom. 42, 16 (2013).). The term tan θ/E is related to the Lorentz-factor and can be addressed by another correction (crystal diffraction efficiency correction) as discussed further down below.

Finally, the triangular part of equation F4 can be written as $$T(E) = \begin{cases} 0 & \text{for } E \le E_1 \text{ or } E \ge E_2 \\ \dfrac{E - E_1}{\bar{E} - E_1} & \text{for } E > E_1 \text{ and } E \le \bar{E} \\ \dfrac{E_2 - E}{E_2 - \bar{E}} & \text{for } E > \bar{E} \text{ and } E < E_2 \end{cases} \tag{F6}$$

This piecewise linear approximation can also be extended to even more sections. Such triangular collimator correction is new to WD detection system modelling.

With the triangular collimator response and the derived integration limits, the profile widths of the characteristic X-ray lines in the simulated intensities (simulated peak widths for the respective elements) are defined by only the collimator width and the crystal lattice plane distance which are both known constants. That is, the number of parameters needed to describe the profiles for the WD detection system modelling is substantially reduced. In prior art approaches, typically for each peak a parameter is needed which has to be calibrated via respective standards. Further, the θ dependent integration width explains, why the background intensity increases from high to low θ angles, since the background is integrated in an increasing energy range from high to low angles. This is a major step towards a complete description of the WD detection system and the relation of background to emission line intensity.

The angular difference $\Delta\theta=\theta_2-\theta_1$ can be transformed to a corresponding energy difference $\Delta E=E_2-E_1$ by $$\Delta E = \frac{dE}{d\theta}\Delta\theta = \frac{12.4\text{ keV Å}}{2d\tan\theta\sin\theta}\Delta\theta = \sqrt{\frac{4dE^2}{12.4^2}-1}\,E\,\Delta\theta \tag{F7}$$

Turning back now to FIG. 1, the correction module 120 has an optimization sub-module 129 adapted to determine 1340 a mathematical distance between the one or more corrected simulated sample intensities and corresponding one or more measured intensities. For example, the distance may use a Minkowski distance metric. A Mikowski distance is typically used with parameters such that the Minkowski distance corresponds to the Manhattan distance, Euclidean distance, or Chebyshev distance. A person skilled in the art may also use other suitable distance metrics.

The sample model parameters 130P of the sample model 130M regarding the sample composition and/or the layer thickness are then adjusted 1360. That is, one or more of the sample parameters 130P are modified by the optimization module 129 in such a way that the distance is reduced (e.g. along the first derivative). Since the influence of the sample model parameters 130P on the simulated intensities 112 is typically non-linear, the determining steps 1320, 1340 and the parameter adjustment step 1360 are then repeated until the change of the distance falls below a minimal change of the distance. In other words, the first derivative is close to zero. Thereby, a checking step 1341 compares the determined mathematical distance change with said minimal distance change. The minimal distance change can be a given threshold value or it may be a relative value.

Finally, the interface of system 100 is adapted to provide the sample model parameters 130P regarding the sample composition and/or the layer thickness associated with the corrected simulated intensities 112-$c$ as approximated concentration values of respective components contained in the measured sample 202 and/or the layer thickness of the measured sample. In other words, once the optimization of the sample model 130M has progressed such that the minimal distance change has been reached, the one or more corrected simulated intensities match the respective one or more measured intensities to such an extent that the model parameters 130P can be interpreted as an indirect measurement result for the sample composition and/or layer thickness parameters of the measured (real-world) sample.

Figure 5A:
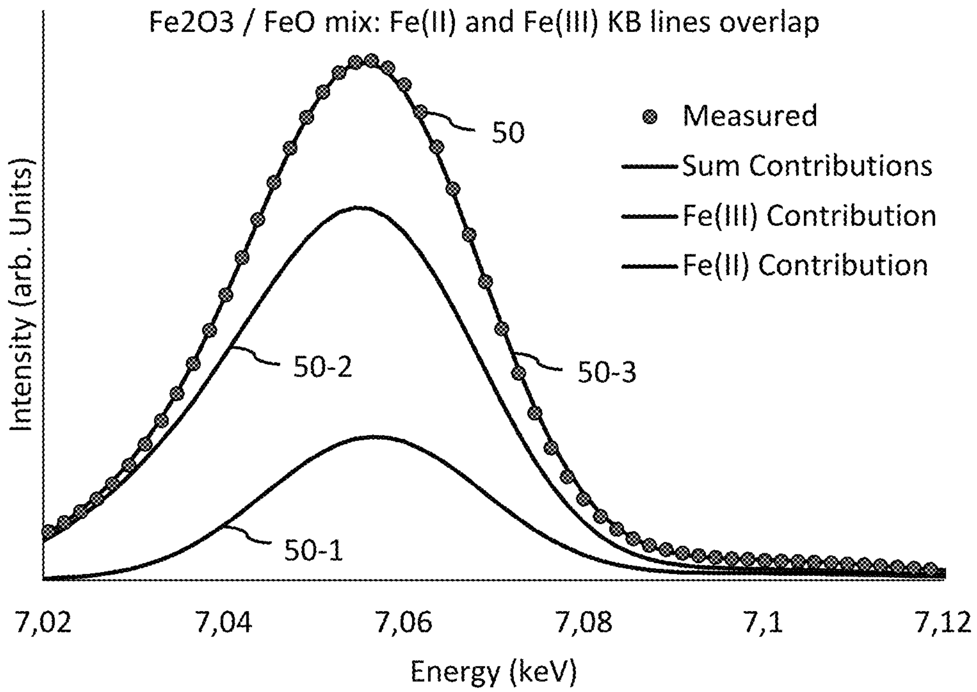
FIGS. 5A and 5B show two examples demonstrating the effect of triangular correction when applied to simulated sample intensities.
Figure 5B:
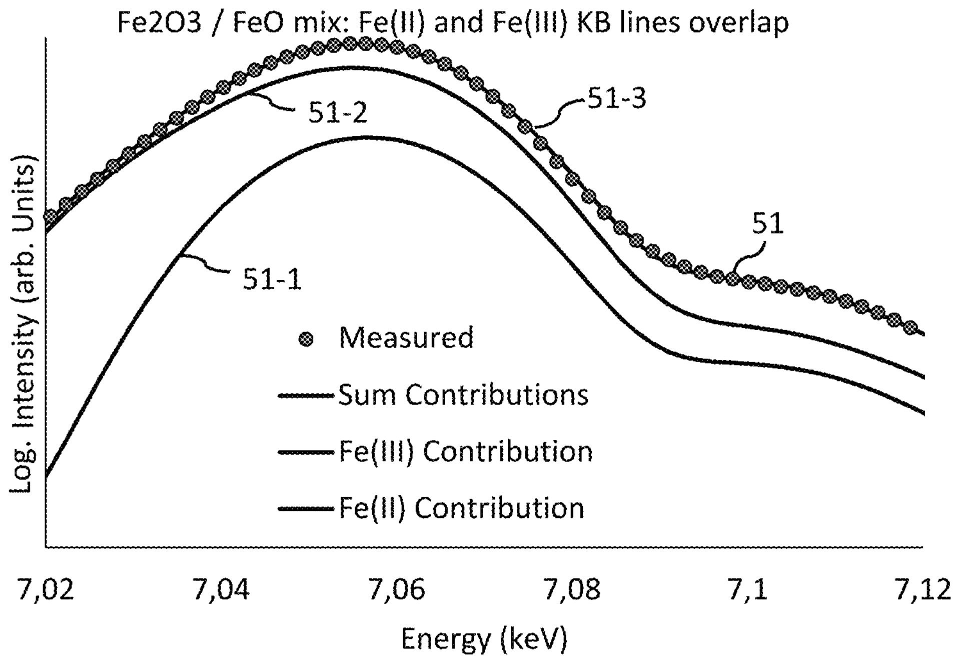

FIGS. 5A and 5B show two examples demonstrating the effect of the triangular correction when applied to the simulated sample intensities. In FIG. 5A, the measured sample contains a mixture of iron in different oxidation states Fe(III) in $Fe_2O_3$ and Fe(II) in FeO. The measured intensities (dots 50) show a single peak for the overlapping Fe(II) and Fe(III) KB lines. In the measured result 50 it is therefore not possible to distinguish between Fe(II) and Fe(III) contributions to the total measured intensities. The sample model which is used for providing simulated intensities has respective concentration parameters for Fe(II) and Fe(III). Line 50-1 illustrates the Fe(II) intensity contributions to the total simulated intensity and line 50-2 shows the Fe(III) intensity contributions. Line 50-3 is the sum of both contributions. FIG. 5A illustrates the final result after sufficient iterations have been performed to minimize the distance between the simulated intensities 50-3 and the measured intensities 50 by adjusting the Fe(II)/Fe(III) concentrations parameters accordingly. These final Fe(II)/Fe (III) concentrations parameters correspond to the indirect measurement of the respective Fe(II)/Fe(III) concentrations in the measured sample. In this example, the Fe(III) concentration is more than twice the Fe(II) concentration. This detailed analysis was not possible with prior art methods.

FIG. 5B shows the same data as in FIG. 5A but with logarithmic intensity axis. This emphasizes the potential of the method to use the shape of the peaks to separate the two components that overlap strongly.

Turning back to FIG. 1, in one embodiment, the correction module 120 may further be adapted to apply 1321 a polarization correction P-C 122 to the one or more simulated sample intensities such that, for each of the one or more diffraction angles θ, the simulated sample intensity $i_{sim}(E)$ is computed as the sum of an emission radiation emitted by the sample multiplied by a first polarization factor for single scattering at the monochromator and a scattered tube radiation scattered by the sample multiplied by a second polarization factor for double scattering at the sample and at the monochromator.

Figure 6:
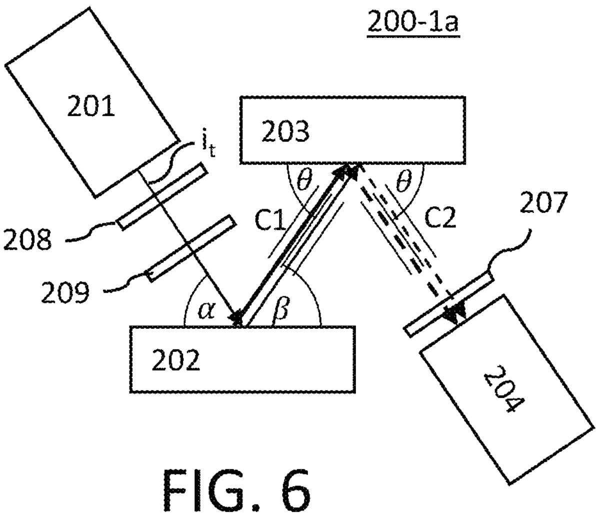
FIG. 6 illustrates a detection system example illustrating details in the context of a polarization correction.

FIG. 6 illustrates a detection system example 200-1*a* with an X-ray tube 201 and sample 202 wherein the X-rays generated by the tube with intensity it pass a tube window 208 and a filter 209 before hitting the sample 202 under an angle α. The black arrows in FIG. 6 indicate the radiation coming from the tube (it) being scattered by the sample 202 (scattered radiation is (E) shown as solid black arrow passing collimator C1) and then again at the crystal 203 towards the detector 204 in the same scattering plane (dashed black arrow passing C2 and detector window 207). The grey (thick) arrows indicate the emission radiation $i_E(E)$ from the sample (solid grey arrow passing collimator C1) being scattered only once at the crystal towards the detector (dashed grey arrow passing collimator C2 and detector window 207). α is the incidence angle and B is the takeoff angle on the sample 202, and θ is the diffraction angle on the crystal 203. A person skilled in the art knows that a scattering can be represented by two vectors (as in the figure). If the vectors are not parallel or anti-parallel, then the vectors always defined a plane. This plane (in which the two scattering vectors lie) is called the scattering plane. The main component of the linear polarization of the scattered radiation is always perpendicular to this plane. In the example of FIG. 6, all vectors are in the plane of the drawing, i.e., in the same plane. However, there are detection systems where not all three scattering vectors are in one plane.

The polarization correction P-C 122 addresses the change in intensity due to polarization by scattering. If an unpolarized beam hits the crystal 203, the outgoing beam is not only diminished by the diffraction efficiency of the crystal but also by the polarization effect of the scattering process. This effect is angle dependent and has its maximum at 2θ=90° between the incoming and outgoing beam. At that angle the outgoing beam is fully linear polarized, and the polarization correction has a value of 50%.

However, in the case of WD detection system 200-1*a*, only the radiation $i_E(E)$ emitted by the sample is unpolarized. The radiation $i_S(E)$ already scattered at the sample is already polarized by that scattering process. Thus, the two contributions to the spectrum are to be treated differently when taking into account for polarization correction. In most detection systems the scattering at the sample and the crystal occurs in the same plane which simplifies the P-C correction. It is however possible to extend P-C 122 to any geometry, for example by using Mueller calculus.

In the following, the common case of both scattering processes occurring in the same plane is addressed, where only the amplitude of the polarization vector parallel to the scattering plane is affected. For unpolarized emission radiation, this polarization vector has the same amplitude as the perpendicular polarization vector before hitting the crystal. Thus, the overall intensity of emissions from the sample are modulated by $$0.5\left(1+\cos^2 2\theta\right)$$

where θ is the diffraction angle on the crystal.

In the case of already scattered radiation (black arrows), the following equation can be used for a WD detection system:

$$\frac{1+\cos^2(\alpha+\beta)\cos^2 2\theta}{1+\cos^2(\alpha+\beta)}$$

with α as the incidence angle on the sample and β as the takeoff angle on the sample.

Consequently, the polarization correction equations are $$P_E(E)=\frac{1+\left[1-2\left(\frac{12.4\text{ keV Å}}{2dE}\right)^2\right]^2}{2}$$

for the first polarization factor for single scattering at the monochromator to be multiplied with the emission radiation emitted by the sample, and $$P_s(E)=\frac{1+\cos^2(\alpha+\beta)\left[1-2\left(\frac{12.4\text{ keV Å}}{2dE}\right)^2\right]^2}{1+\cos^2(\alpha+\beta)}$$

for the second polarization factor for double scattering at the sample and at the monochromator to be multiplied with the scattered tube radiation scattered by the sample.

Equation (F4) when further including P-C 122 is modified into Equation F4-1:

$$I(\overline{E})=\int_{E_1}^{E_2}\{T(E)[P_E(E)i_E(E)+P_S(E)i_s(E)]\}dE \tag{F4-1}$$

Where $P_E(E)$ and $P_S(E)$ are the polarization factors for emission radiation and scattered radiation respectively, and $i_E(E)$ and $i_S(E)$ are the emission radiation and the scattered radiation in $s^{-1}$ $eV^{-1}$, respectively.

Figure 7A:
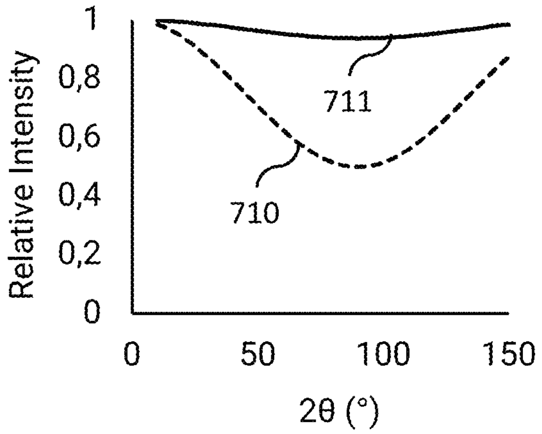
FIGS. 7A, 7B illustrate evolution of the polarization correction for a LiF200 crystal over 20 and over energy.
Figure 7B:
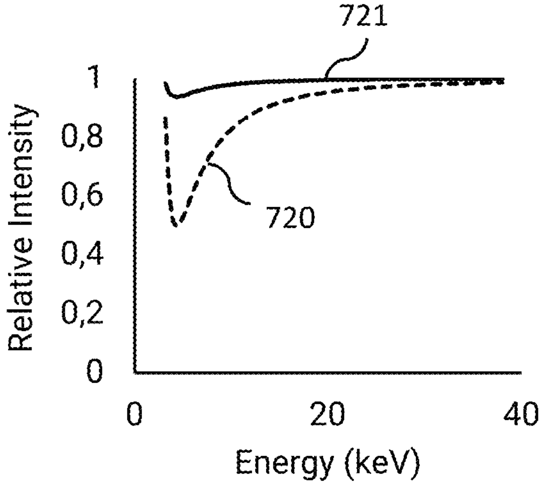

The separation of the effect of polarization on the components of the radiation hitting the detector further improves the accuracy of the simulated intensities for the WD detection system response. As a consequence, the accuracy of the model parameters is also improved once the minimal distance is reached. That is, the indirectly measured sample parameters (component concentrations/layer thickness) become even more reliable when adding the polarization correction 122 to the triangular correction 121 as illustrated in formula F4-1 for computing the corrected simulated intensities. For example, the polarization correction also explains why the peak to background ratios (emission radiation/scattered radiation) are different than in energy-dispersive (ED) detection systems. The evolution of the polarization correction for a LiF200 crystal (d=2.01 Å) over 2θ is illustrated in FIG. 7A and the polarization correction over energy is illustrated in FIG. 7B. The dashed lines 710, 720 represent the emission radiation $i_E(E)$ and the solid lines 711, 712 the scattered tube radiation $i_s(E)$ (α+β=105°).

Figure 8A:
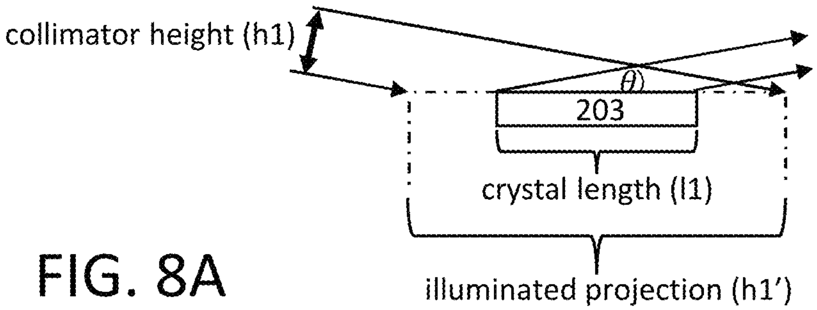
FIG. 8A shows a monochromator crystal having a particular length being smaller than the illuminated projection of the collimator height of a collimator used for the incident radiation.
Figure 8B:
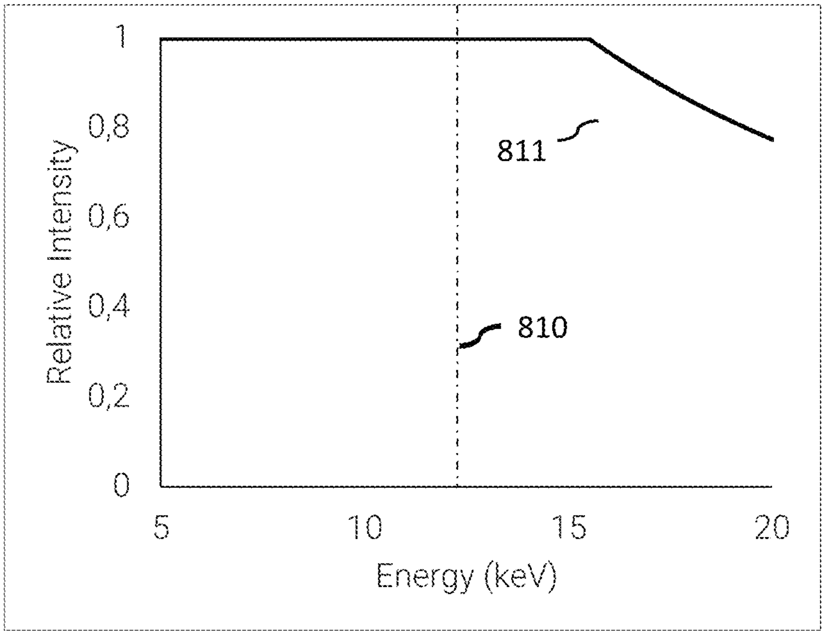
FIG. 8B illustrates the crystal length effect on the intensity for an exemplary LiF200 crystal.

Turning briefly back to FIG. 1, in one embodiment, the correction module 120 may further be adapted to apply 1322 a crystal length correction CL-C 123 to the one or more simulated sample intensities 112. Details of CL-C 123 are now discussed in the context of FIGS. 8A to 8C. FIG. 8A shows the crystal 203 having a length l1. The collimator has a fixed height h1, and the transmitted intensity illuminating the plane of the crystal 203 is a projection of this height on the crystal plane. The length of the projection is dependent on the diffraction angle θ. If the illuminated length is larger than the finite crystal length, intensity is lost because only the beams which hit the crystal surface (grey arrows) are scattered towards the detector. FIG. 8B illustrates this effect on the intensity for a LiF200 crystal where the collimator height is 2 cm and the crystal length is 7 cm. At energies beyond the dashed-dotted energy threshold 810 the scattered intensity 811 declines rapidly. In other words, at higher diffraction angles θ (below energy threshold 810), the illuminated projection h1' is smaller than the crystal length l1 and all the intensity which leaves the collimator is reflected by the crystal:

$$\frac{h1}{h1'(\theta)} = \sin\theta$$

Using the Bragg equation F3 provides:

$$h1'(E) = h1\, 2\, d\, E \frac{12.4}{\text{keV Å}}$$

with h1 as the collimator height, h1' the illuminated projection, and d the lattice plane distance of the crystal. The crystal length correction CL-C 123 is then:

$$L(E) = \begin{cases} 1 & \text{for } h1'(E) \le l1 \\ \frac{l1}{h1'(E)} & \text{for } h1'(E) > l1 \end{cases}$$

with l1 as the length of the crystal.

Equation F4-1 when further including CL-C 123 is modified into Equation F4-2:

$$I(\overline{E}) = \int_{E_1}^{E_2} \{T(E)L(E)[P_E(E)i_E(E) + P_S(E)i_S(E)]\}dE \tag{F4-2}$$

In other words, for diffraction angles θ where the projection h1' of the collimator height h1 on the crystal monochromator plane is larger than the length l1 of the crystal, the one or more simulated sample intensities are then multiplied by the ratio of the length l1 of the crystal to the length of the projection h1' of the collimator height on the crystal monochromator plane to arrive at the corrected simulated intensities 112-*c*.

It is to be noted that, in one embodiment, the crystal length correction 123 may be applied together with the triangular correction 120 only. In general, the triangular correction may be combined with any of the optional corrections 121 to 128, or with any subset of the optional corrections.

Figure 8C:
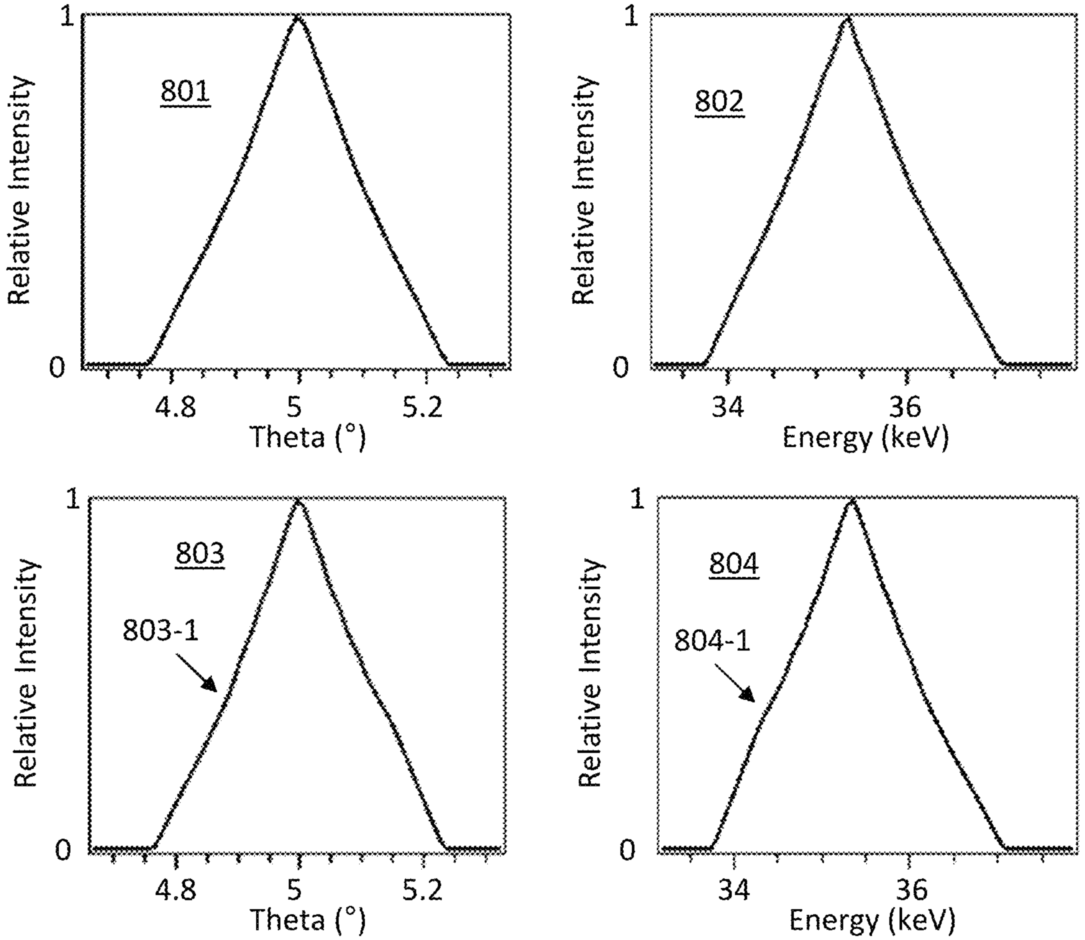
FIG. 8C illustrates the impact of a crystal length correction on the triangular correction according to an embodiment.

FIG. 8C illustrates the impact of finite crystal length on the triangular correction 120. When taking into account the finite crystal length during raytracing of the profile shape, it leads to a small asymmetry for low diffraction angles θ that can be corrected by shifting the knots of the piecewise linear function accordingly. Graphs 801 to 804 show raytracing results 801, 803 for $\overline{\theta}$=5° and the corresponding energy distributions 802, 804 for a LiF200 crystal (d=2.01 Å). The upper diagrams 801, 802 are calculated for an infinite crystal. The lower diagrams are calculated for a finite crystal. The small asymmetries introduced by the finite crystal length are visible in the graphs 803, 804 in the area indicated by the respective arrows 803-1, 804-1.

As can be seen from FIG. 1, the detection system 200-1 may further include a detector window 207 between the crystal monochromator 203 and the X-ray detector 204. In this case, the correction module 120 may further comprise a window transmission correction function WT-C 124 which can be applied 1323 to the one or more simulated sample intensities 112 such that, for each respective diffraction angle θ, the simulated sample intensity is multiplied by a transmission factor defined by the material and thickness of the detector window 207.

The detector window transmission is defined as the ratio of the intensity $$I_W^a$$

after the window and the intensity $$I_W^b$$

before the window and can be expressed in terms of the absorption properties of the material:

$$W(E) = \frac{I_w^a(E)}{I_w^b(E)} = e^{-\mu_W(E)\rho_W t_W}$$

with the energy dependent mass absorption coefficient $\mu_W(E)$, the density $\rho_W$ and the thickness $t_W$ of the window material.

Equation F4-2 when further including WT-C 124 is modified into Equation F4-3:

$$I(\bar{E}) = \int_{E_1}^{E_2} \{T(E)L(E)W(E)[P_E(E)i_E(E) + P_S(E)i_s(E)]\}dE \tag{F4-3}$$

Structures like silicon support grids to prevent ruptures of foil or multi-layer windows and can also be modelled by combining multiple window transmission terms additive and multiplicative, respectively. An optional window in front of the primary collimator 205 can be treated equally.

The correction module 120 may further be adapted to apply 1324 a detector efficiency correction function DE-C 125 to the one or more simulated sample intensities such that, for each respective diffraction angle θ, the simulated sample intensity is multiplied by an absorption factor defined by the material and thickness of the detector.

The detector efficiency is defined as the ratio of the intensity $$I_D^a$$

absorbed in the active detector material and the intensity $$I_D^0$$

incident to the active detector material and is the complementary part of the transmission of the active detector material:

$$D(E) = \frac{I_D^a(E)}{I_D^0(E)} = 1 - e^{-\mu_D(E)\rho_D t_D}$$

with the energy dependent mass absorption coefficient $\mu_D(E)$, the density $\rho_D$ and the thickness $t_D$ of the active detector material.

A different incident angle β on the detector can be taken into account by dividing the thicknesses t by sin β. However, generally an incidence angle of 90° is used in WD detection systems. The underlying correction model considers the detector 204 to be infinite in its size perpendicular to the incidence of the beam. This is an approximation, that is sufficient for current devices. However, this model can be adjusted to take into account the real size of the detector, too.

Equation F4-3 when further including DE-C 125 is modified into Equation F4-4:

$$I(\bar{E}) = \int_{E_1}^{E_2} \{T(E)L(E)W(E)D(E)[P_E(E)i_E(E) + P_S(E)i_S(E)]\}dE \tag{F4-4}$$

The correction module 120 may further be adapted to applying 1325 a crystal diffraction efficiency correction function CE-C 126 to the one or more simulated sample intensities. In this embodiment, for each respective diffraction angle θ, the simulated sample intensity is divided by the part of the incoming intensity being absorbed by the crystal and adjusted by a crystal geometry factor.

Starting from the "master equation for crystallography" (5.30) and substitute by (5.28) in J. Als-Nielsen and D. McMorrow, Elements of Modern X-Ray Physics, 2nd ed. (Wiley, Hoboken, 2011) the integrated intensity $I_{SC}$ can be computed as:

$$I_{SC} = \Phi_0\left(\frac{d\sigma}{d\Omega}\right)\frac{\lambda^3}{\sin 2\theta}$$

with $\Phi_0$ as the incident flux, $$\frac{\lambda^3}{\sin 2\theta}$$

as the term resulting from the integration over θ (related to the Lorentz-Factor), and $$\left(\frac{d\sigma}{d\Omega}\right)$$

as the differential elastic scattering cross section without polarization. In the above Als-Nielsen et al. reference, the polarization is part of the differential scattering cross section, but in the herein disclosed approach the polarization is treated separately for scattered tube radiation and emission. The differential scattering cross section without the polarization is scattering angle dependent and energy independent.

Equation (5.31) of G. Remond, P. Coutures, C. Gilles, and D. Massiot, Analytical Description of X-Ray Peaks: Application to L X-Ray Spectra Processing of Lanthanide Elements by Means of the Electron Probe Micro-Analyzer, Scanning Microsc. 3, (1989) describes the effect of absorption of the crystal for the case infinite thickness. This can be adjusted to address crystals with finite thickness. However, for the typical crystals used in WD detection systems, the crystals can be regarded as infinitely thick in the energy range they are used, resulting in $$I_{SC} = \Phi_0\frac{1}{2\mu}\left(\frac{d\sigma}{d\Omega}\right)\frac{\lambda^3}{\sin 2\theta}.$$

On page 176 of the above Redmond et al. reference, the dependency of the structure factor (that is part of the differential scattering cross section) on the thermal roughening of the reciprocal lattice is described by the term $$e^{-M}$$

where $$M = B_T\left(\frac{\sin\theta}{\lambda}\right)^2$$

which can be transformed by using the Bragg equation F1 into:

$$M = B_T\left(\frac{n}{2d}\right)^2$$

with the Debye-Waller factor Br being constant and all other parameters being constant. The scattering cross section can be replaced by a single general scaling factor g that is adjusted for each crystal only once.

Transforming the above equations to the energy dimension using again the Bragg equation results in:

$$C(E) = \frac{I_{SC}}{\Phi_0} = g\frac{1}{2\mu(E)}2d^2\,2d\sin\theta\tan\theta = g\frac{1}{2\mu(E)}2d^2\,12.4\text{ keV Å}\,\frac{\Delta\theta}{\Delta E}$$

In other words, the absorption part $$\frac{1}{2\mu}$$

is considered when modelling the WD detection system which is further step towards a full description of the WD detection system efficiency. The term 2d $$\sin\theta\tan\theta = 12.4\text{ keV Å}\,\frac{\tan\theta}{E} = 12.4\text{ keV Å}\,\frac{\Delta\theta}{\Delta E}$$

represents the transformation of the integral as shown by the earlier mentioned Iwata et al. reference and is related to the Lorentz-Factor.

Equation F4-4 when further including CE-C 126 is modified into Equation F4-5:

$$I(\overline{E}) = \int_{E_1}^{E_2}\{T(E)L(E)W(E)D(E)C(E)[P_E(E)i_E(E) + P_S(E)i_s(E)]\}dE \tag{F4-5}$$

The correction module 120 may further be adapted to apply 1326 a pile-up correction PU-C 127 to the one or more simulated sample intensities such that, for each respective diffraction angle, the simulated sample intensity is multiplied by an exponential function describing the intensity loss which results from counting two photons arriving within a predefined time window as a single photon with the double energy.

The detector 204 is unable to distinguish if the signal results from two photons hitting the detector at roughly the same time or one photon with double energy. Consequently, a pile-up intensity peak PU1 is expected at double energy of the 1st diffraction order energy of the monochromator crystal (also the 2nd order corresponds to double energy). Due to detector electronics optimized for high count rate this effect is smeared between 1st and 2nd order O1, O2. The effect dependents non-linearly on the intensity. The higher the intensity, the higher the effect. For low intensities it is insignificant.

However, the upper discrimination limit PHA150 of PHA discriminator window may cut right through the pile-up that is part of the analytical signal (with the correction that each counted photon in the pile-up corresponds to two analytically relevant photons). Again, intensity is lost, and the detector efficiency is reduced at high count rates by the factor $$U(E) = e^{-I'(\overline{E})p}$$

with I'(Ē) the intensity of Equation (3) without the pile-up correction and p as a parameter that must be adjusted by calibration to address the influence of the upper discrimination limit of the detector. The exponential expression is a known equation for pile-up (cf. G. Blaj et al., Optimal Pulse Processing, Pile-Up Decomposition, and Applications of Silicon Drift Detectors at LCLS, IEEE Trans. Nucl. Sci. 64, 2854 (2017)).

Equation F4-5 when further including PU-C 127 is modified into Equation F4-6:

$$I(\overline{E}) = \int_{E_1}^{E_2}\{T(E)L(E)W(E)D(E)C(E)U(E)[P_E(E)i_E(E) + P_S(E)i_s(E)]\}dE \tag{F4-6}$$

Taking pile-up into account for the efficiency calculation of the WD detection system allows to model profile shapes in measurements with high count rates. When measuring a peak in a WD 2θ scan, the highest measuring points are diminished relative to other points of the same peak. This results in peaks in the 2θ scan with a flatter tip of the peak. For this reason, state-of-the-art used profiles (e.g., pseudo-Voigt) differ significantly from the measurement in cases of a high count-rate and require a reduction of the count rate by decreasing the power and, as a consequence, the performance of the device. The use of the PU-C 127 correction function overcomes the problem and allows to perform measurements at high count rates without suffering from the prior art disadvantage.

Figure 9A:
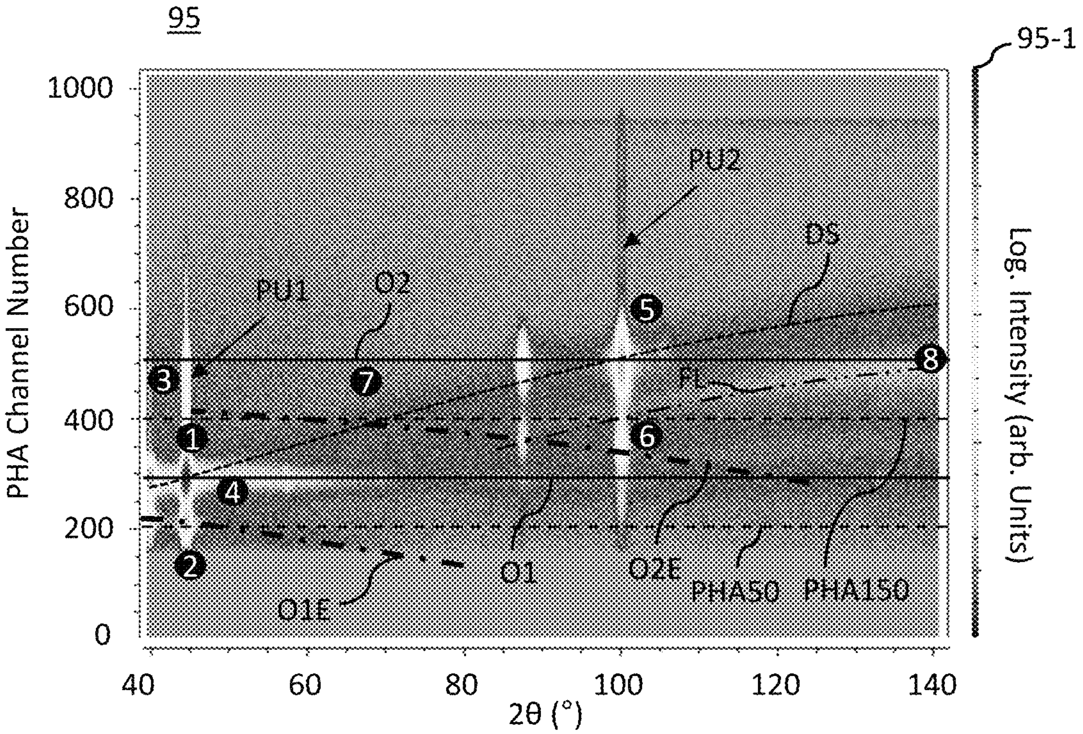
FIG. 9A is a heat map of example PHA spectra obtained from a copper sample visualizing additional contributions to background.
Figure 9B:
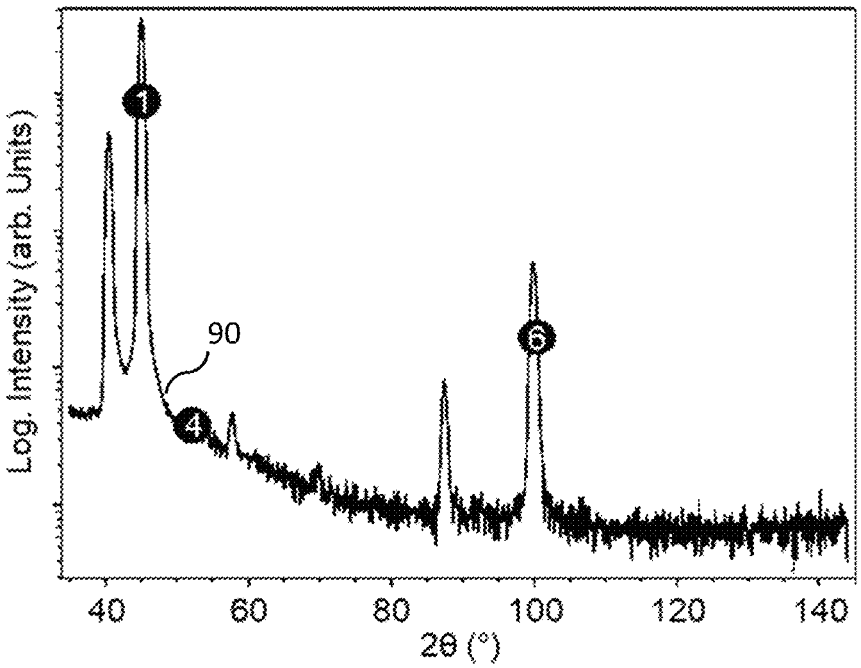
FIG. 9B shows the result of the integration of the PHA spectra in the heat map.

There are intensity contributions reaching the detector in ways different than described in the above description. Such contributions are called background contributions. FIGS. 9A, 9B visualize the result of a 20 scan of a copper (Cu) sample whereby each point of the spectrum was recorded by a detector with multi-channel analyzer (energy dispersive) in such a way, that the expected photon energy (first order of the monochromator—cf. Bragg Equation F3) is always at the same channel number. This is referred to 100% of the expected energy. The Cu sample was measured as 2θ scan at 50 kV using a Rh tube, a 500 μm Al filter, and a LiF200 crystal monochromator and an Ar gas detector. FIG. 9A shows a heat map 95 of the obtained PHA spectra visualizing additional contributions to background. The 2θ spectrum 90 shown in FIG. 9B is the result of integrating the PHA between 50% and 150% (PHA50 and PHA150 respectively) of the expected energy (O1). The intensity in the heat map 95 is logarithmic and illustrated by different grey levels 95-1. The markers 1 to 8 (shown as black bullets with the respective numbers) are explained in detail in the following. Thereby, makers 1, 4 and 6 in spectrum 90 correspond to the respective markers in heatmap 95.

At marker 1 in heatmap 95 the Cu KA line gives a strong signal at the position of 1st order O1 (100% PHA). To the left of marker 1 is another high intensity of Cu KB. For the following, Cu KA is used as an example for the processes in the detector that occur for any photon hitting the detector (emission or sample scattered radiation).

Two additional intensity maxima can be observed above and below the 1st order peak of Cu KA at marker 1 in heatmap 95, respectively. One maximum is near the lower discrimination limit PHA50 (50% PHA) indicated by marker 2 and another maximum extending from the 1st order O1 through the upper discrimination limit PHA150 towards the 2nd order O2 at marker 3. The latter is the pile-up PU1 that has already been explained in the context of the PU-C correction function 127.

The additional intensity at marker 2 is due to the escape of fluorescence photons from the active detector material (in the example Ar) after an incoming photon has interacted with the active detector material. This additional peak at marker 2 is thus part of the analytically relevant information and may be integrated. However, as can be seen by the dash-dotted 1st order Ar Escape line O1E the relative distance between the 1st order part O1 of the analytical intensity and the escaped intensity increases with increasing 2θ. Since the integration range is fixed (from PHA50 to PHA150), the escape peak O1E in the PHA will move through the lower discrimination limit PHA50 with increasing 2θ, reducing the analytically relevant intensity being integrated.

As mentioned above, the monochromator crystal allows multiple diffraction orders and thus allows multiples of the first order energy (O1 in 95) to hit the X-ray detector. Marker 5 in 95 is the 2nd order peak of Cu KA, with the same additional intensity maxima as discussed before. Here the Ar Escape peak falls partly into the discriminator window (between PHA50 and PHA150). However, now it does not belong to the analytically relevant intensity, since the 1st order energy is here half of the Cu KA energy. This again happens for all photons hitting the X-ray detector. This is indicated by the dash-dotted 2nd order Ar Escape line O2E. The escape peak O2E in the PHA will move into the integration range coming from the higher discrimination limit PHA150 with increasing 2θ, thus adding to the background caused by detector artefacts.

The correction module 120 may further be adapted to apply 1327 a background correction function 128 to the one or more simulated sample intensities to further take into account an intensity loss caused by the escape of photons from the active detector material, and/or an intensity gain caused by higher diffraction order artefacts of the monochromator. Thereby, for each respective diffraction angle, the corresponding intensity loss and/or intensity gain is added to the corrected simulated sample intensity 112-*c*.

Such a reduction of efficiency depends on the discrimination limits and detector material and only occurs if the photon energy is above the edge energy of the detector material escape fluorescence line. In the following, this escape effect (i.e., the loss $b_{Escape}$(E)) is calculated exemplarily for a gas counter detector with Argon as the active material.

$$b_{Escape}(E) = \begin{cases} 0 \text{ for } E < E_{Ar\,K} \\ -e_{Ar\,KA}\, i(E)\frac{1}{2}\left[1 + \operatorname{erf}\left(\dfrac{l - \frac{E - E_{Ar\,KA}}{E}}{\sigma_{PHA}(E)}\right)\right] \text{ for } E \geq E_{Ar\,K} \end{cases}$$

with $E_{Ar\ K}$ as the K edge energy of Argon and $e_{Ar\ KA}$ as the escape probability of an Ar KA emission from the detector. This could be energy dependent but in the case of the gas counter detector it is not. i(E) is the expected intensity hitting the detector. This is followed by the integration of a Gaussian profile from 0% PHA to l as the lower discrimination limit (here 50% PHA). EAT KA is the energy of the Ar KA escape emission and $\sigma_{PHA}$(E) is the standard deviation of the PHA peaks. The expression is negative, because intensity is lost if the Argon escape peak is cut by the lower discrimination limit.

Using equation F3, 2θ=40° corresponds to 8 keV (Cu KA energy), 2θ=100° corresponds to 4 keV (both at 1st order). However, for diffraction order n=2 the energy is again 8 keV (Cu KA energy). Correspondingly, an intensity profile similar to that at marker 1 is also visible at marker 5 (also pile-up PU2 is extending further upwards). Also, here an escape peak is visible at marker 6 and reaches into the integration range.

However, in this case the intensity is not belonging to the analytically relevant information at 2θ=100° (4 keV) but is nevertheless integrated. This contribution is similar to $b_{escape}$ described above, but has a positive sign. That is, it adds to the overall background.

$$b_{2ndorder}(E) = \begin{cases} 0 \text{ for } 2E < E_{Ar\,K} \\ e_{Ar\,KA}\, i(2E)\frac{1}{2}\left[\operatorname{erf}\left(\dfrac{u - \frac{2E - E_{Ar\,KA}}{E}}{\sigma_{PHA}}\right) - \operatorname{erf}\left(\dfrac{l - \frac{2E - E_{Ar\,KA}}{E}}{\sigma_{PHA}}\right)\right] \text{ for } 2E \geq E_{Ar\,K} \end{cases}$$

In comparison to the expression for $b_{escape}$ the double energy is used for the origin of the intensity, and integration is performed from the lower discrimination limit l (PHA50) to the upper discrimination limit u (PHA150). This correction can also be relevant for higher orders where the '2' in the equation above is replaced by the corresponding diffraction order.

The effect of the escape as described above with clearly visible peaks at markers 1 and 5 also applies to regions of the spectrum without clear peaks, for example at marker 4, where the main contribution at 1st order energy O1 is due to scattered tube Bremsstrahlung from the sample.

All background contributions b(E) (including $b_{Escape}$(E), $b_{2nd\ order}$(E), etc.) may simply be added to the corrected simulated intensities in any of the equations F4*. Equation F4-6 when further including background correction function B-C 128 is modified into equation F4-7 which then includes all corrections provided by the correction module 120 in a full-blown embodiment (modeling all potential impacts of the detection system 200-1 on the simulated intensities):

$$I(\bar{E}) = \int_{E_1}^{E_2} \{T(E)L(E)W(E)D(E)C(E)U(E)[P_E(E)i_E(E) + P_S(E)i_S(E)] + b(E)\}dE \qquad \text{(F4-7)}$$

Figure 10:
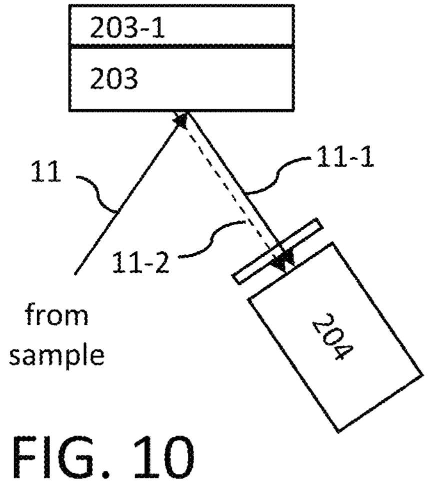
FIG. 10 illustrates an example source of background radiation caused by the crystal and its holder.

FIG. 10 illustrates a further source of background which can be subject to correction. The contribution indicated by marker 7 in FIG. 9A is due to diffuse (non-Bragg) scattering DS of the sample emission by the crystal and sample-scattered radiation originating from the sample. Marker 8 indicates fluorescence radiation FL originating from the holder of the crystal and the crystal itself (in this example, only the crystal holder fluorescence is visible). The intensity of the iron fluorescence FL increases by increasing 2θ since the incoming and outgoing radiation on the crystal is getting steeper with 2θ and thus the absorption of the crystal is reduced.

In this embodiment, the model of the WD detection system also calculates the fluorescence and diffuse scattering contribution to the background of the WD detector response. The crystal 203 is thereby mounted on a holder 203-1. The bold arrows 11, 11-1 indicate the radiation coming from the sample and then being scattered by the crystal 203 and the holder 203-1 towards the detector 204. The dashed arrow 11-2 indicates the emission radiation from the crystal 203 and the holder 203-1.

Both effects can be calculated from a simplified state-of-the-art EDX modelling solutions where the crystal 203 and its holder 203-1 are described as a multilayer sample and the excitation radiation is the radiation coming from the sample. The profiles can be simple Gaussian profiles with standard deviation $\sigma_{PHA}$. And the incoming and outgoing beam angle varies with 2θ. The contribution to the background of the WD response can be calculated by integration between the energy of the lower PHA discrimination limit (l*E) and the upper PHA discrimination limit (u*E).

With the above elaborated solutions, the background contributions described by the above cited Portnoi et al. reference can be calculated. Additionally, the effect of scattering and the fluorescence from the crystal holder are included. Other detectors may have other ways to integrate the intensity. Corresponding adjustments can be made to the above-mentioned background contribution calculation. Other effects such as holes in the efficiency due to Renninger Effect, photo-electrons or extinction from the crystal can be modelled in a similar way.

For solving the integral of F4-7 (and the other integrals F* in an analogous manner) to obtain the respective corrected simulated one or more intensities one may either integrate numerically, or find a solution to integrate analytically. The former has the advantage that it allows to integrate approximation functions that are not analytically integrable. The latter has the advantage of being significantly faster and wider applicable. For this purpose, all contributions that are close to linear within the integration range can be approximated as constant with the value of the center energy.

$$I(\bar{E}) = L(\bar{E})C(\bar{E})W(\bar{E})D(\bar{E})U(\bar{E})\left[P_E(\bar{E})\int_{E_1}^{E_2} T(E)i_E(E)dE + P_S(\bar{E})\int_{E_1}^{E_2} T(E)i_S(E)dE\right] + b(\bar{E}).$$

Integration of the continuous part of the scattered radiation is simple, since both the description of the continuous part and the triangle are piecewise polynomials which can be multiplied and piecewise integrated. The integration of the multiplication of the piecewise linear triangle function with the pseudo-Voigt profile of the emission and sample-scattered characteristic tube lines can be solved by partial integration of each piece of the piecewise linear function of the triangle.

$$\int_{E_1}^{E_2} T(E)v(E) =$$

-continued $$\int_{E_1}^{E_2} T(E)[\eta l(E) + (1-\eta)g(E)] = \eta\int_{E_1}^{E_2} T(E)l(E) + (1-\eta)\int_{E_1}^{E_2} T(E)g(E).$$

The integral of a piecewise linear function multiplied by any function $f$(E) can be solved by:

$$\int_{E_1}^{E_2} T(E)f(E) = [T(E)F(E)]_{E_1}^{E_2} - \int_{E_1}^{E_2} T'(E)F(E)$$

In the case of the triangular correction function T(E) there are two pieces in the piecewise linear function: the raising part and the falling part of the triangle that are both '1' at E and '0' at $E_1$ and $E_2$, respectively. With the derivative $$T'(E) = \begin{cases} 0 & \text{for } E \le E_1 \text{ or } E \ge E_2 \\ \frac{1}{\bar{E} - E_1} & \text{for } E > E_1 \text{ and } E \le \bar{E} \\ -\frac{1}{E_2 - \bar{E}} & \text{for } E > \bar{E} \text{ and } E < E_2 \end{cases}$$

one gets $$[T(E)F(E)]_{E_1}^{\bar{E}} + [T(E)F(E)]_{\bar{E}}^{E_2} - \int_{E_1}^{\bar{E}} \frac{F(E)}{\bar{E} - E_1} - \int_{\bar{E}}^{E_2} \frac{F(E)}{\bar{E} - E_2}$$

with $$[T(E)F(E)]_{E_1}^{\bar{E}} + [T(E)F(E)]_{\bar{E}}^{E_2} = T(\bar{E})F(\bar{E}) - T(E_1)F(E_1) + T(E_2)F(E_2) - T(\bar{E})F(\bar{E}) = 1 - 0 + 0 - 1 = 0$$

the integral reduces to $$-\int_{E_1}^{\bar{E}} \frac{F(E)}{\bar{E} - E_1} - \int_{\bar{E}}^{E_2} \frac{F(E)}{\bar{E} - E_2}.$$

For solving this reduced integral, the cumulative probability function for the Cauchy (Lorentzian profile)

$$\int_a^b L(E) = \left[\frac{E}{2} + \frac{E}{\pi}\operatorname{atan}\left(\frac{E - E_E}{\gamma}\right) + \frac{E_E}{\pi}\operatorname{atan}\left(\frac{E_E - E}{\gamma}\right) - \frac{\gamma}{2\pi}\log\left(E_E^2 - 2E_E E + \gamma^2 + E^2\right)\right]_a^b$$

and Normal (Gaussian profile) distribution $$\int_a^b G(E) = \frac{1}{2}\left[E + (E - E_E)\operatorname{erf}\left(\frac{E - E_E}{\sqrt{2}\sigma}\right) + \sqrt{\frac{2\sigma^2}{\pi}}\, e^{-\frac{(E-E_E)^2}{2\sigma^2}}\right]_a^b.$$

is integrated.

The above is the solution for a triangle, the solution for any other piecewise linear function is very similar. Using other approximation functions (such as Lorentz or Gauss functions) for the triangular profile shape may also result in similar results.

Figure 11:
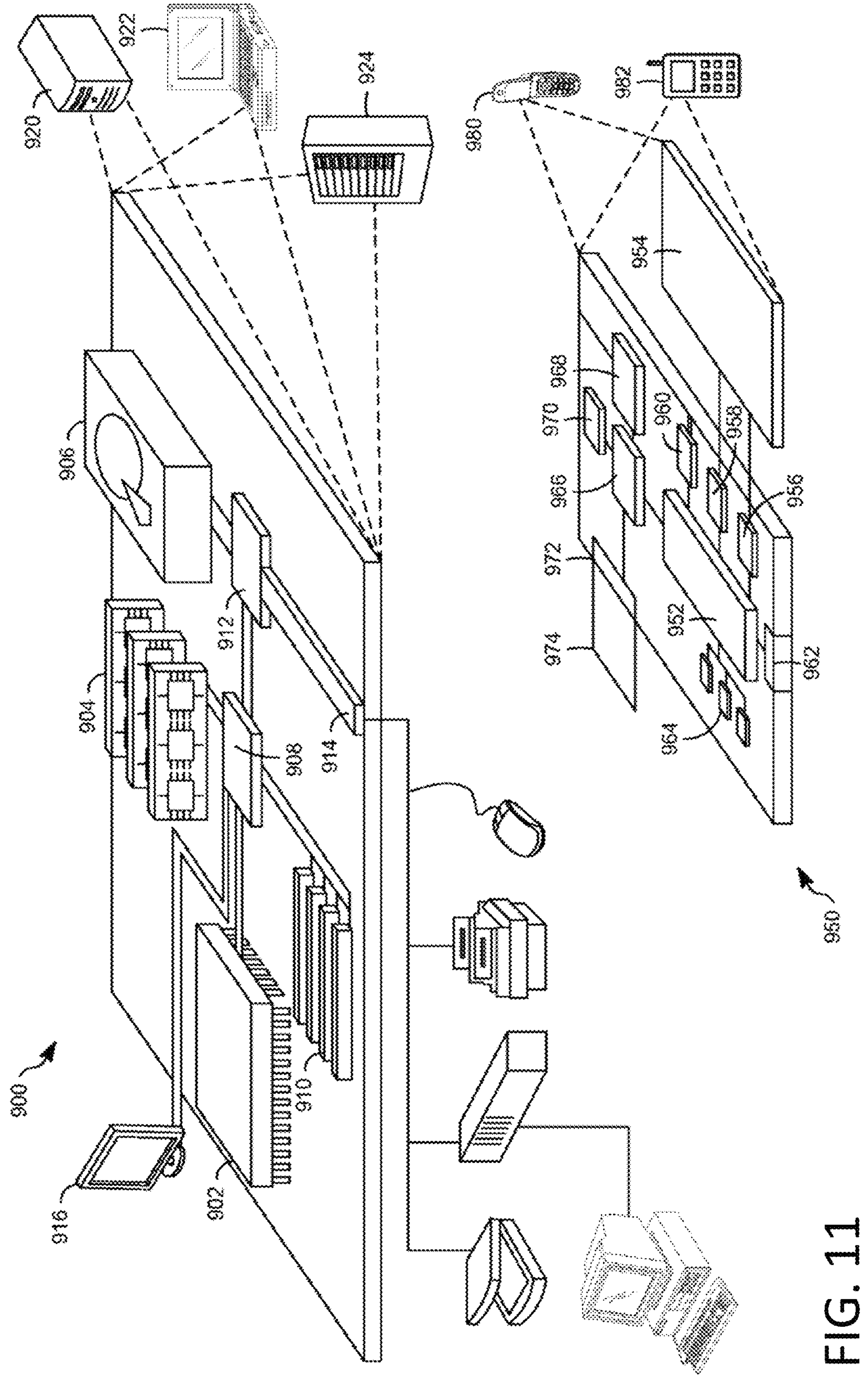
FIG. 11 is a diagram that shows an example of a generic computer device and a generic mobile computer device, which may be used with the techniques described herein.

FIG. 11 is a diagram that shows an example of a generic computer device 900 and a generic mobile computer device 950, which may be used with the techniques described here.

In some embodiments, computing device 900 may relate to system 100 (cf. FIG. 1). Such a computer device 900 may be implemented as an integrated component of X-ray detection system 200 (e.g., a wave-length dispersive X-ray fluorescence spectrometer). Computing device 950 is intended to represent various forms of mobile devices, such as personal digital assistants, cellular telephones, smart phones, and other similar computing devices. In the context of this disclosure the computing device 950 may provide I/O means for a user to interact with the computing device 950 (e.g., for receiving the sample model parameters 130P and/or the corrected simulated spectra 112-*c*). The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method for approximating one or more X-ray intensities for a sample measured by an X-ray detection system with at least one collimator having a given angular range, a crystal monochromator and an X-ray detector, the method comprising:

receiving one or more measured intensities from the X-ray detection system at respective one or more diffraction angles;

computing, for the respective one or more diffraction angles, one or more simulated sample intensities from an X-ray fluorescence sample model with initial sample model parameters indicating a sample composition and/or layer thickness of one or more sample layers;

applying a collimator correction to the one or more simulated sample intensities for the respective one or more diffraction angles by:

determining, for each of the one or more diffraction angles, an integral over an energy range allowed by the angular range of the at least one collimator, wherein the integral is computed over a multiplicative product of a respective simulated sample intensity and an approximation function approximating a triangular shaped profile representing a relative intensity distribution in the angular range caused by an angular tolerance of the crystal monochromator defined by a divergence of the at least one collimator, the determined integral representing a corrected simulated sample intensity;

determining a mathematical distance between the one or more corrected simulated sample intensities and corresponding one or more measured intensities;

adjusting the sample model parameters regarding the sample composition and/or the layer thickness and repeating the determining operations and the adjusting operation until a change of the distance falls below a minimal distance change; and providing the sample model parameters regarding the sample composition and/or the layer thickness associated with the corrected simulated intensities as approximated concentration values of respective components contained in the measured sample and/or the layer thickness of the measured sample.

2. The method of claim 1, wherein applying the collimator correction further comprises:

applying a polarization correction to the one or more simulated sample intensities such that, for each of the one or more diffraction angles, the simulated sample intensity is computed as a sum of an emission radiation emitted by the sample multiplied by a first polarization factor for single scattering at the monochromator and a scattered tube radiation scattered by the sample multiplied by a second polarization factor for double scattering at the sample and at the monochromator.

3. The method of claim 1, wherein applying the collimator correction further comprises:

applying a crystal length correction to the one or more simulated sample intensities such that, for diffraction angles where a projection of a collimator height on a crystal monochromator plane is larger than the length of the crystal, the one or more simulated sample intensities are multiplied by a ratio of the length of the crystal to the length of the projection of the collimator height on the crystal monochromator plane.

4. The method of claim 1 further taking into account an impact of a detector window between the crystal monochromator and the X-ray detector, wherein applying the collimator correction further comprises:

applying a window transmission correction to the one or more simulated sample intensities such that, for each respective diffraction angle, the simulated sample intensity is multiplied by a transmission factor defined by a material and thickness of the detector window.

5. The method of claim 1, wherein applying the collimator correction further comprises:

applying a detector efficiency correction to the one or more simulated sample intensities such that, for each respective diffraction angle, the simulated sample intensity is multiplied by an absorption factor defined by a material and thickness of the detector.

6. The method of claim 1, wherein applying the collimator correction further comprises:

applying a crystal diffraction efficiency correction to the one or more simulated sample intensities such that, for each respective diffraction angle, the simulated sample intensity is divided by a part of an incoming intensity being absorbed by the crystal and adjusted by a crystal geometry factor.

7. The method of claim 1, wherein applying the collimator correction further comprises:

applying a pile-up correction to the one or more simulated sample intensities such that, for each respective diffraction angle, the simulated sample intensity is multiplied by an exponential function describing an intensity loss which results from counting two photons arriving within a predefined time window as a single photon with double energy.

8. The method of claim 1, wherein applying the collimator correction further comprises:

applying a background correction to the one or more simulated sample intensities, for taking into account an intensity loss caused by an escape of photons from active detector material, and/or an intensity gain caused by higher diffraction order artefacts of the monochromator, such that, for each respective diffraction angle, a corresponding intensity loss and/or corresponding intensity gain is added to the corrected simulated sample intensity.

9. The method of claim 1, wherein the corrected simulated sample intensity provides an optimized quantification of the composition of the sample and/or layer thickness of the one or more sample layers based on the one or more measured intensities.

10. A computer system for approximating one or more X-ray intensities for a sample measured by an X-ray detection system with at least one collimator having a given angular range, a crystal monochromator and an X-ray detector, the computer system comprising:

an interface adapted to receive one or more measured intensities from the detection system at respective one or more diffraction angles;

a sample simulation module adapted to compute, for the respective one or more diffraction angles, one or more simulated sample intensities from an X-ray fluorescence sample model with initial sample model parameters indicating a sample composition and/or layer thickness of one or more sample layers;

a correction module adapted to apply a collimator correction to the one or more simulated sample intensities for the respective one or more diffraction angles by:

determining, for each of the one or more diffraction angles, an integral over an energy range allowed by the angular range of the at least one collimator, wherein the integral is computed over a product of a multiplication of the respective simulated sample intensity with an approximation function approximating a triangular shaped profile representing a relative intensity distribution in the angular range caused by an angular tolerance of the crystal monochromator defined by a divergence of the at least one collimator, the determined integral representing a corrected simulated sample intensity;

determining a mathematical distance between the one or more corrected simulated sample intensities and corresponding one or more measured intensities;

adjusting the sample model parameters regarding the sample composition and/or the layer thickness and repeating the determining operations and the adjusting operation until a change of the distance falls below a minimal distance change; and the interface further adapted to provide the sample model parameters regarding the sample composition and/or the layer thickness associated with the corrected simulated intensities as approximated concentration values of respective components contained in the measured sample and/or the layer thickness of the measured sample.

11. The computer system of claim 10, wherein the correction module is further adapted to apply a polarization correction to the one or more simulated sample intensities such that, for each of the one or more diffraction angles, the simulated sample intensity is computed as a sum of an emission radiation emitted by the sample multiplied by a first polarization factor for single scattering at the monochromator and a scattered tube radiation scattered by the sample multiplied by a second polarization factor for double scattering at the sample and at the monochromator.

12. The computer system of claim 10, wherein the correction module is further adapted to apply a crystal length correction to the one or more simulated sample intensities such that, for diffraction angles where a projection of a collimator height on a crystal monochromator plane is larger than the length of the crystal, the one or more simulated sample intensities are multiplied by a ratio of the length of the crystal to the length of the projection of the collimator height on the crystal monochromator plane.

13. The computer system of claim 10 further taking into account an impact of a detector window between the crystal monochromator and the X-ray detector, wherein the correction module is further adapted to apply a window transmission correction to the one or more simulated sample intensities such that, for each respective diffraction angle, the simulated sample intensity is multiplied by a transmission factor defined by a material and thickness of the detector window.

14. The computer system of claim 10, wherein the correction module is further adapted to apply a detector efficiency correction to the one or more simulated sample intensities such that, for each respective diffraction angle, the simulated sample intensity is multiplied by an absorption factor defined by a material and thickness of the detector.

15. A computer program product for approximating one or more X-ray intensities for a sample measured by an X-ray detection system with at least one collimator having a given angular range, a crystal monochromator and an X-ray detector, the computer program product being tangibly embodied on a non-transitory computer-readable storage medium and comprising instructions that, when executed by at least one computing device, are configured to cause the at least one computing device to:

receive one or more measured intensities from the X-ray detection system at respective one or more diffraction angles;

compute, for the respective one or more diffraction angles, one or more simulated sample intensities from an X-ray fluorescence sample model with initial sample model parameters indicating a sample composition and/or layer thickness of one or more sample layers;

apply a collimator correction to the one or more simulated sample intensities for the respective one or more diffraction angles by:

determining, for each of the one or more diffraction angles, an integral over an energy range allowed by the angular range of the at least one collimator, wherein the integral is computed over a multiplicative product of a respective simulated sample intensity and an approximation function approximating a triangular shaped profile representing a relative intensity distribution in the angular range caused by an angular tolerance of the crystal monochromator defined by a divergence of the at least one collimator, the determined integral representing a corrected simulated sample intensity;

determining a mathematical distance between the one or more corrected simulated sample intensities and corresponding one or more measured intensities;

adjusting the sample model parameters regarding the sample composition and/or the layer thickness and repeating the determining operations and the adjusting operation until a change of the distance falls below a minimal distance change; and provide the sample model parameters regarding the sample composition and/or the layer thickness associated with the corrected simulated intensities as approximated concentration values of respective components contained in the measured sample and/or the layer thickness of the measured sample.

16. The computer program product of claim 15, wherein the instructions, when executed, are further configured to cause the at least one computing device to apply the collimator correction by:

applying a polarization correction to the one or more simulated sample intensities such that, for each of the one or more diffraction angles, the simulated sample intensity is computed as a sum of an emission radiation emitted by the sample multiplied by a first polarization factor for single scattering at the monochromator and a scattered tube radiation scattered by the sample multiplied by a second polarization factor for double scattering at the sample and at the monochromator.

17. The computer program product of claim 15, wherein the instructions, when executed, are further configured to cause the at least one computing device to apply the collimator correction by:

applying a crystal length correction to the one or more simulated sample intensities such that, for diffraction angles where a projection of a collimator height on a crystal monochromator plane is larger than the length of the crystal, the one or more simulated sample intensities are multiplied by a ratio of the length of the crystal to the length of the projection of the collimator height on the crystal monochromator plane.

18. The computer program product of claim 15, further taking into account an impact of a detector window between the crystal monochromator and the X-ray detector, wherein the instructions, when executed, are further configured to cause the at least one computing device to apply the collimator correction by:

applying a window transmission correction to the one or more simulated sample intensities such that, for each respective diffraction angle, the simulated sample intensity is multiplied by a transmission factor defined by a material and thickness of the detector window.

19. The computer program product of claim 15, wherein the instructions, when executed, are further configured to cause the at least one computing device to apply the collimator correction by:

applying a detector efficiency correction to the one or more simulated sample intensities such that, for each respective diffraction angle, the simulated sample intensity is multiplied by an absorption factor defined by a material and thickness of the detector.

20. The computer program product of claim 15, wherein the instructions, when executed, are further configured to cause the at least one computing device to apply the collimator correction by:

applying a crystal diffraction efficiency correction to the one or more simulated sample intensities such that, for each respective diffraction angle, the simulated sample intensity is divided by a part of an incoming intensity being absorbed by the crystal and adjusted by a crystal geometry factor.

* * * * *